Figure 1:
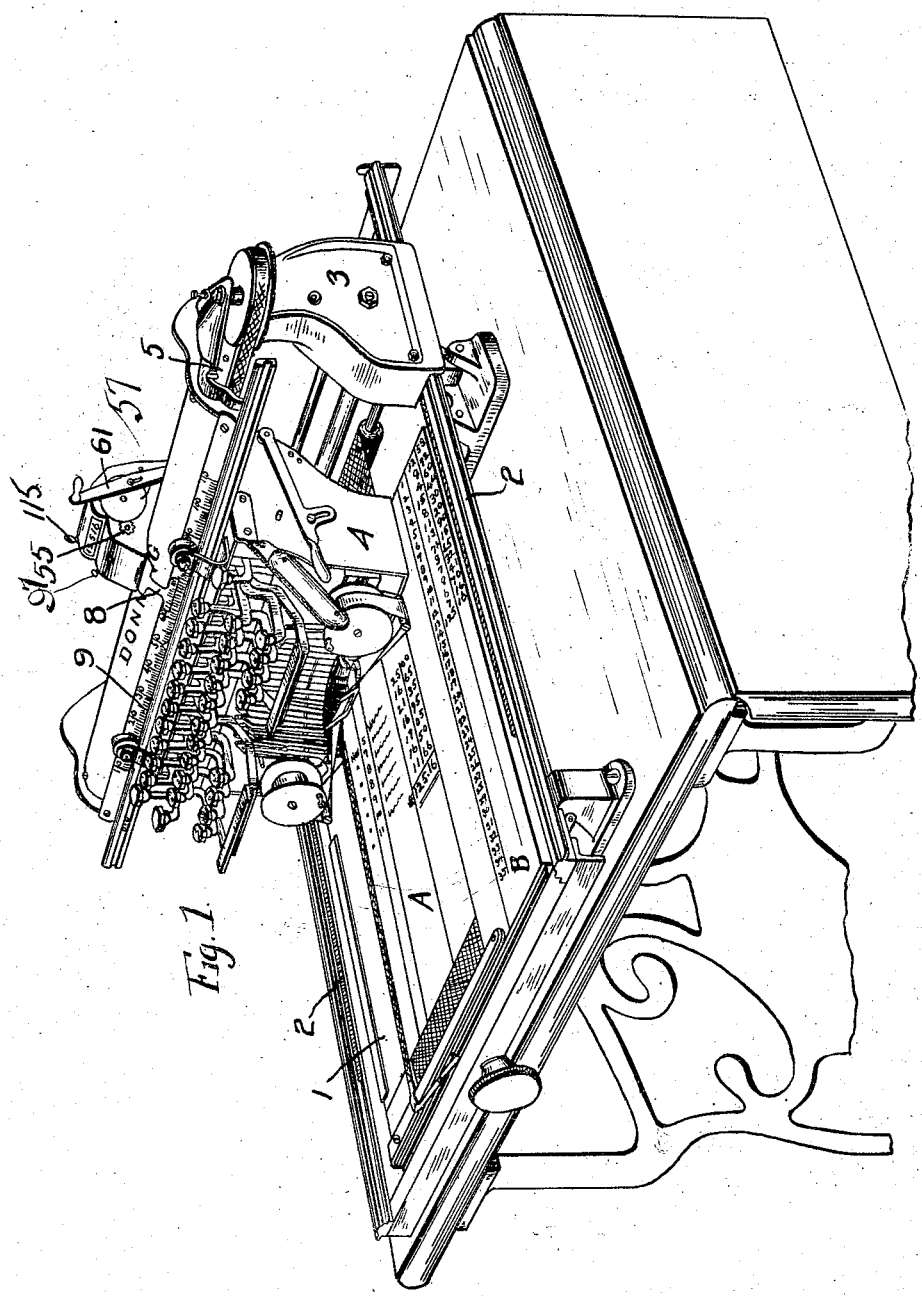
Figure 2:
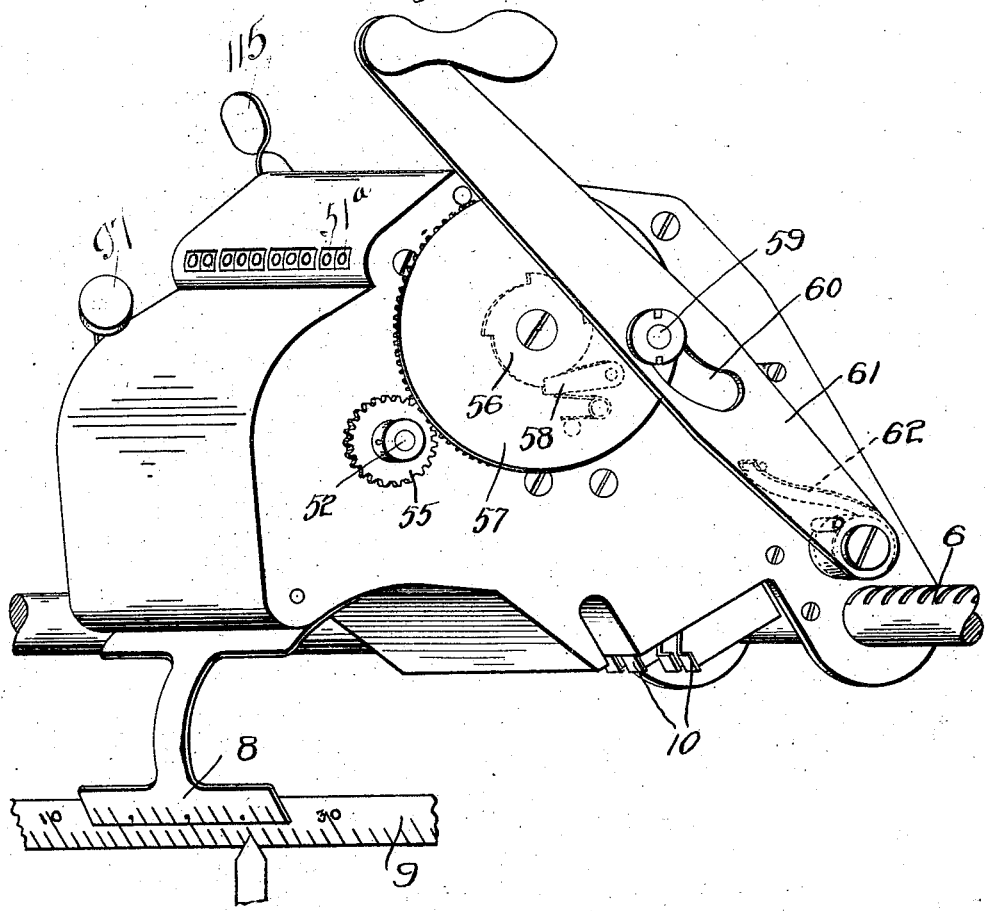
Figure 17:
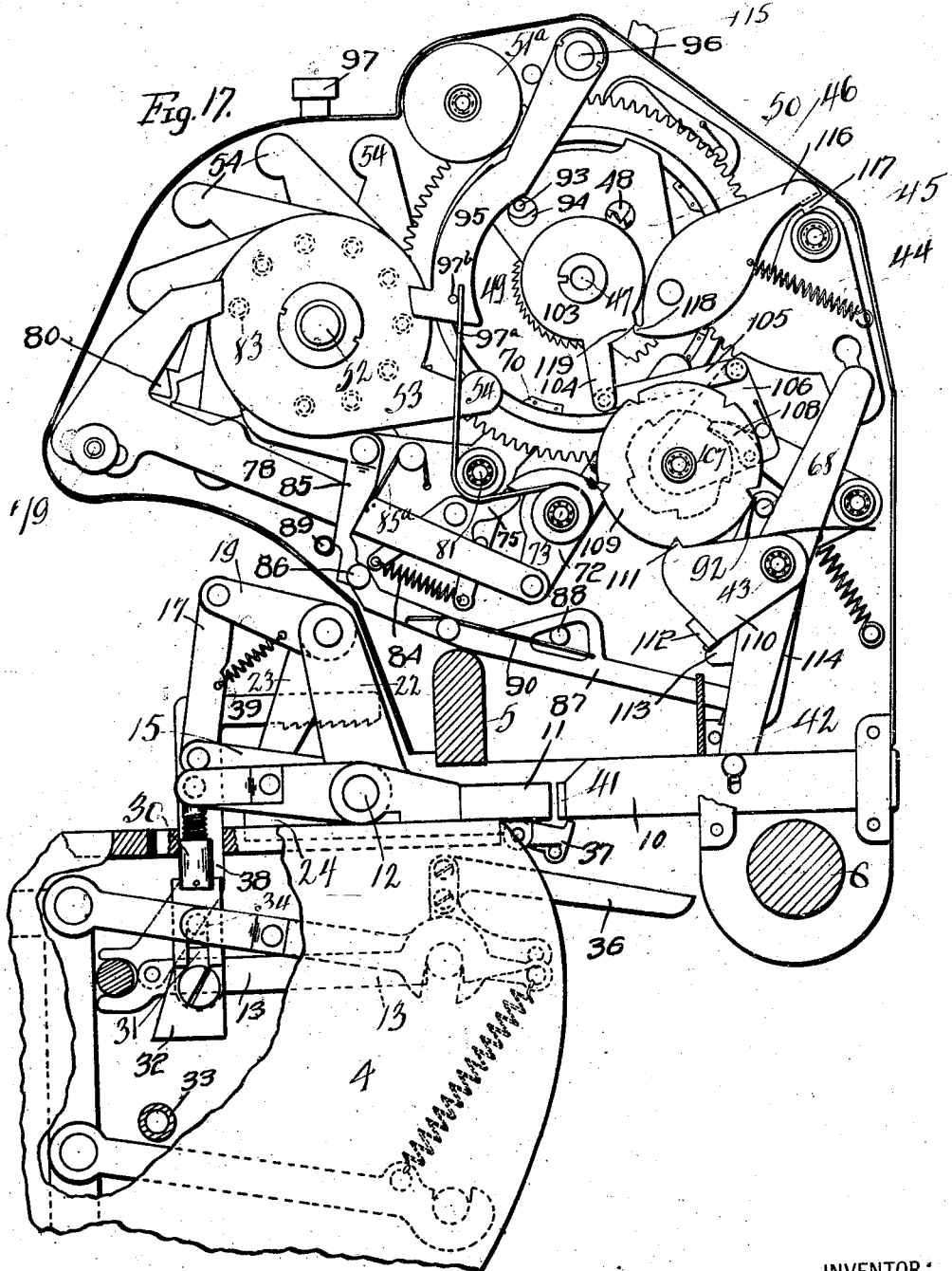
Figure 23:
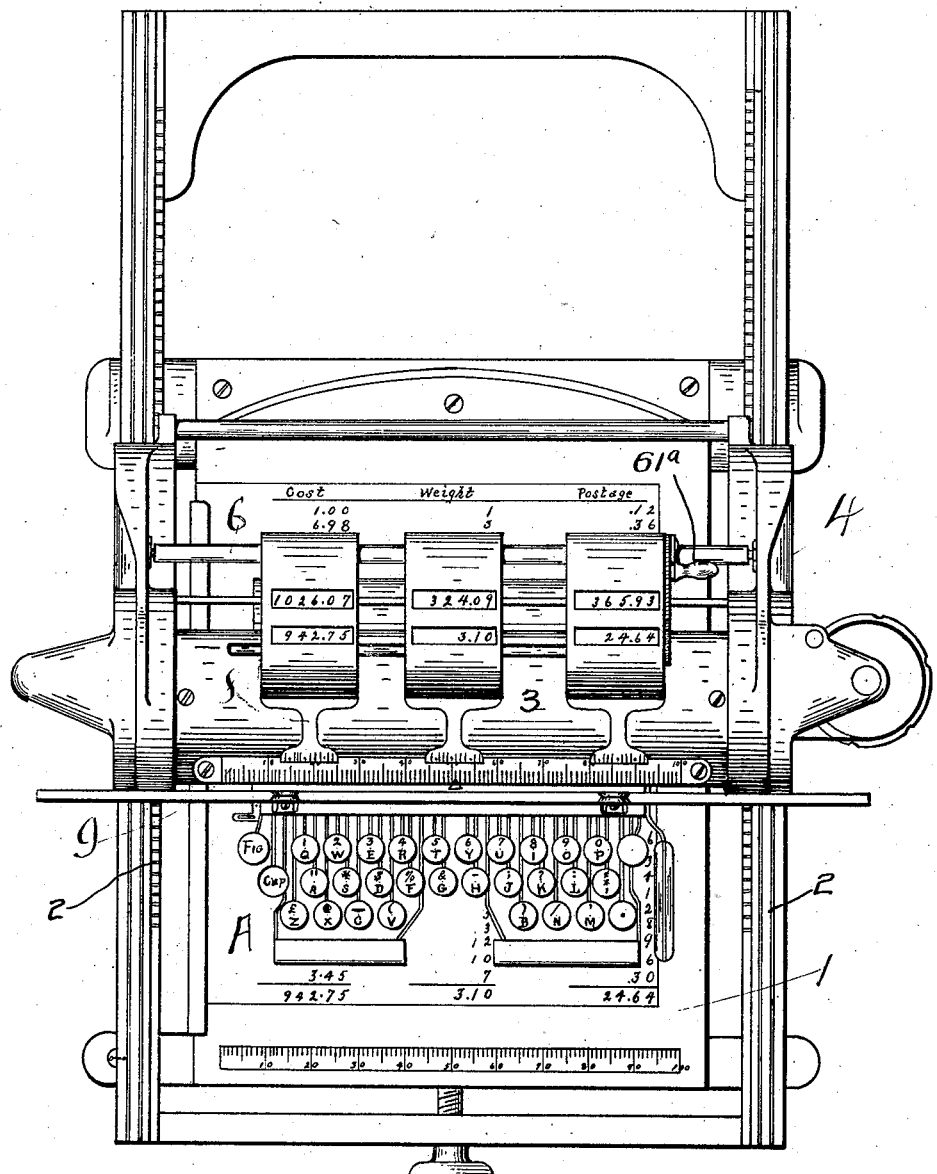
Figure 24:
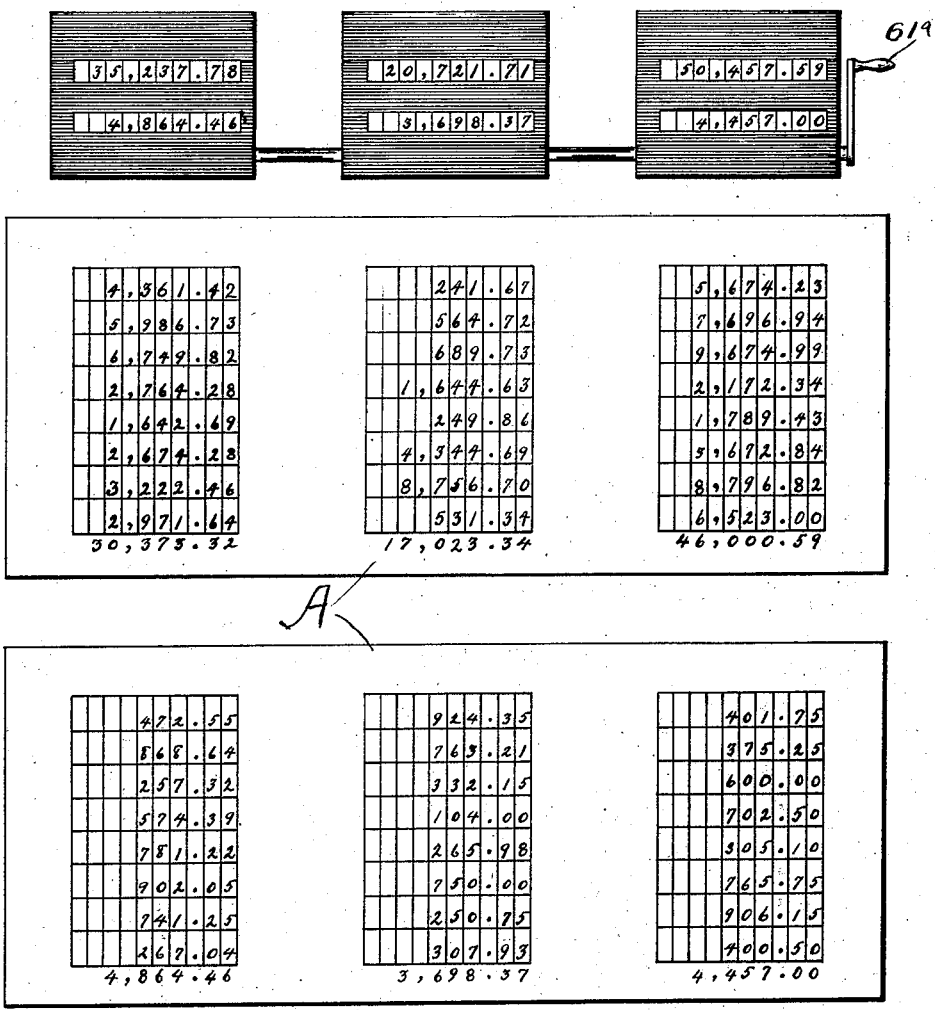

E. C. WALTER.
CALCULATING ATTACHMENT FOR TYPE WRITING MACHINES.
APPLICATION FILED JUNE 18, 1908.

963,727.

Patented July 5, 1910.
16 SHEETS—SHEET 1.

WITNESSES:
Harold E. Stonebraker.
Agnes Quinn.

INVENTOR:
Edward C. Walter,
BY
Drenforth & Parry
HIS ATTORNEYS.

E. C. WALTER.
CALCULATING ATTACHMENT FOR TYPE WRITING MACHINES.
APPLICATION FILED JUNE 18, 1908.

963,727.

Patented July 5, 1910.
16 SHEETS—SHEET 2.

WITNESSES:
Harold E. Stonebraker.
Agnes Quinn.

INVENTOR:
Edward C. Walter,
BY
Drenforth & Parry
HIS ATTORNEYS.

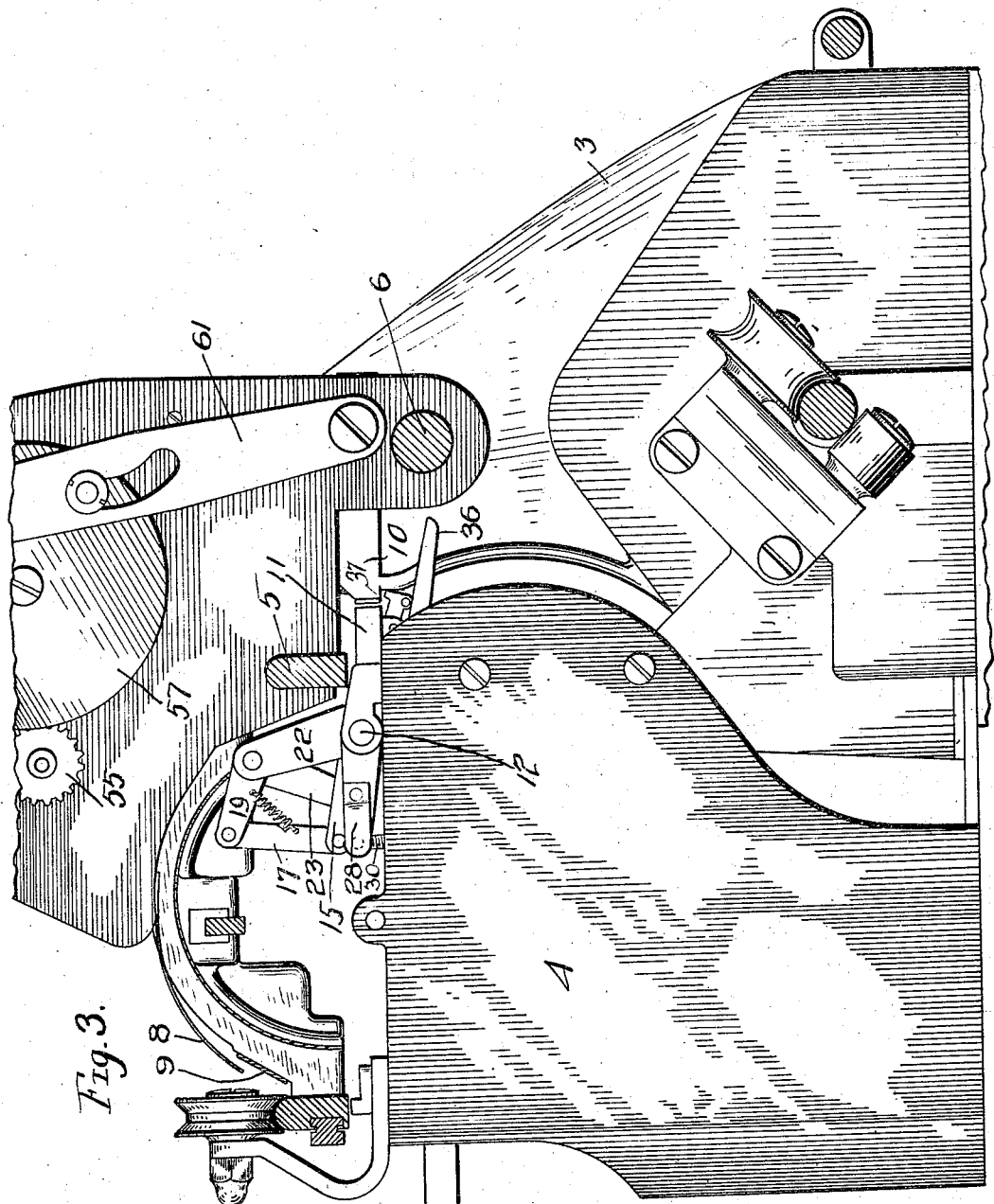

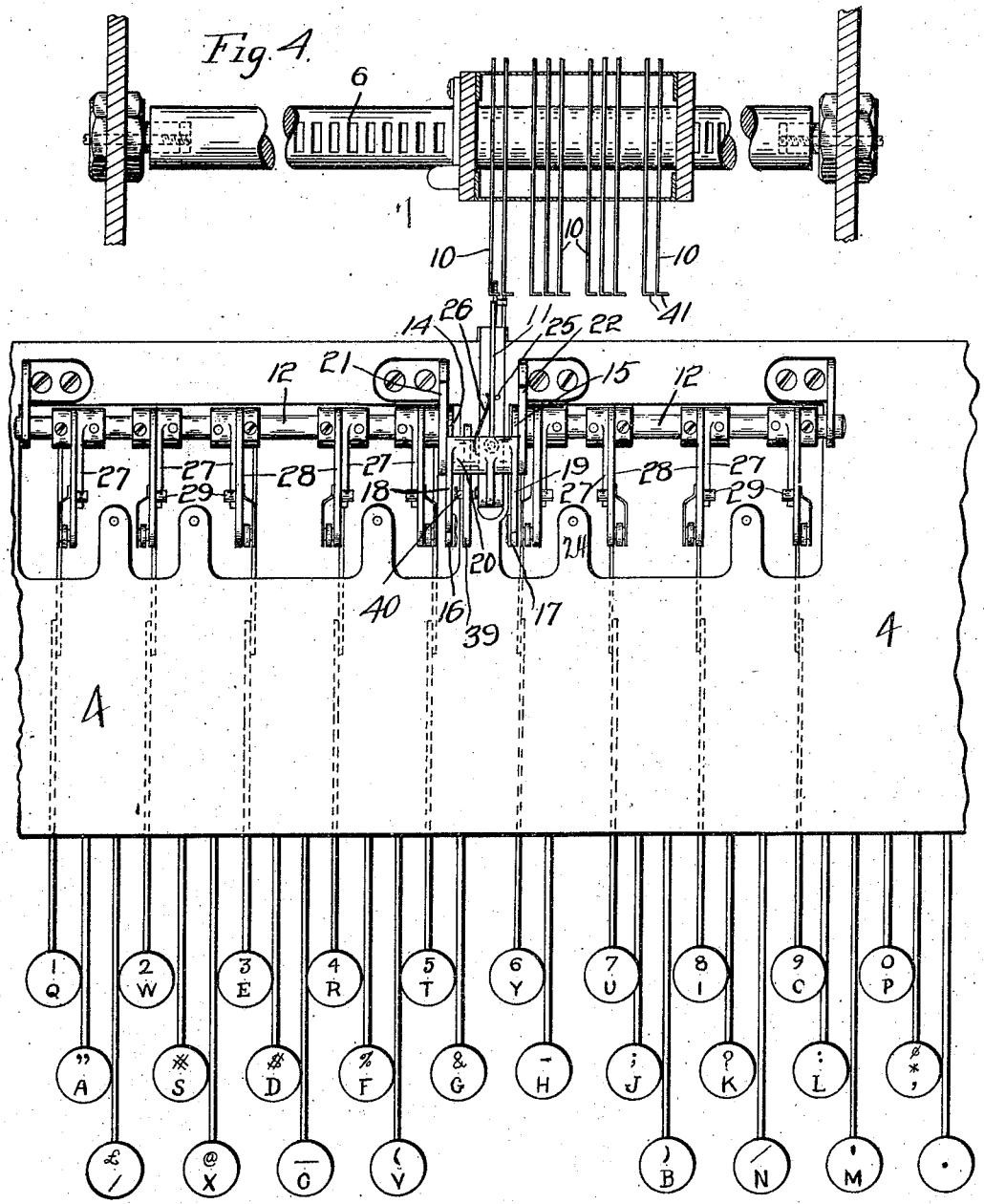

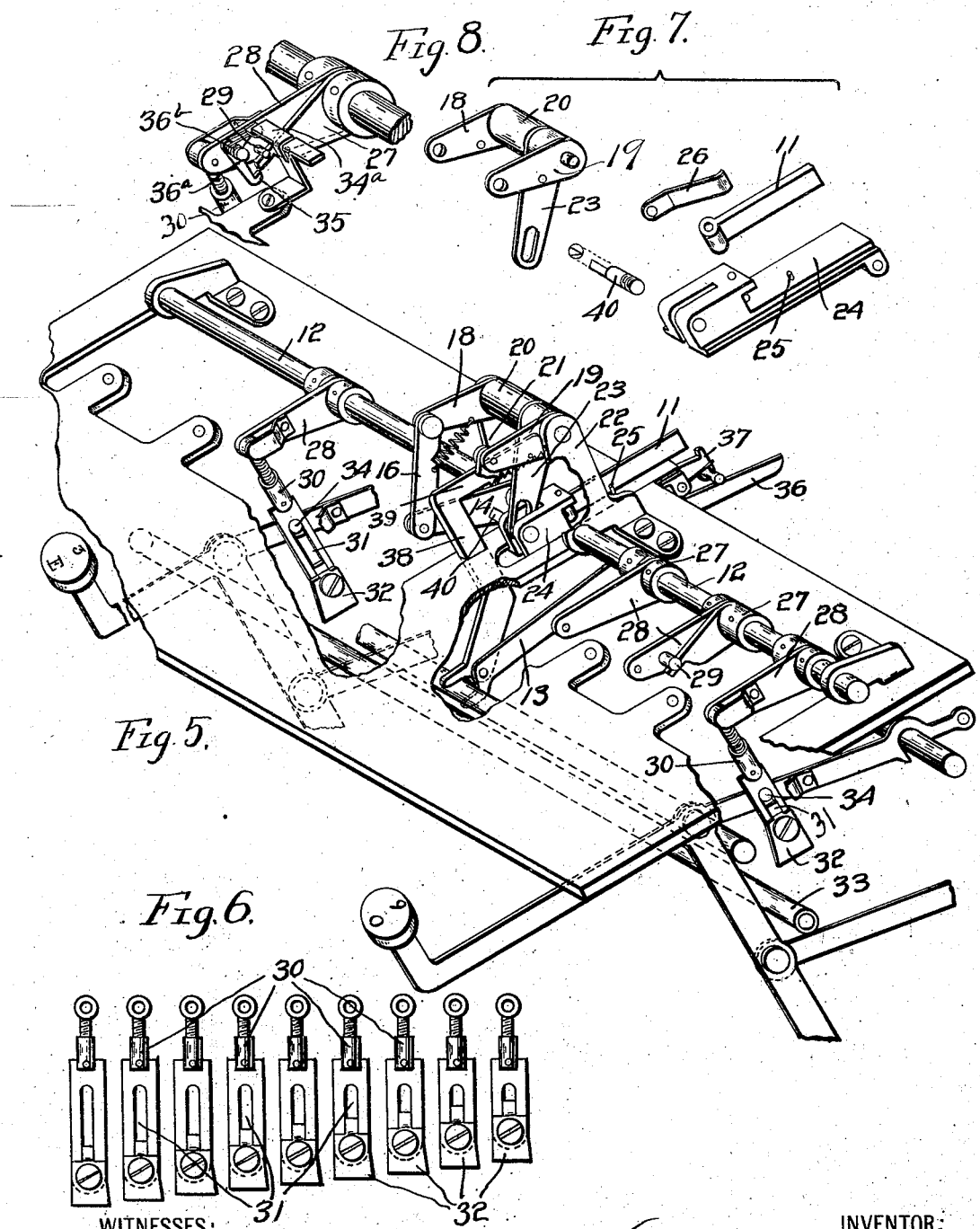

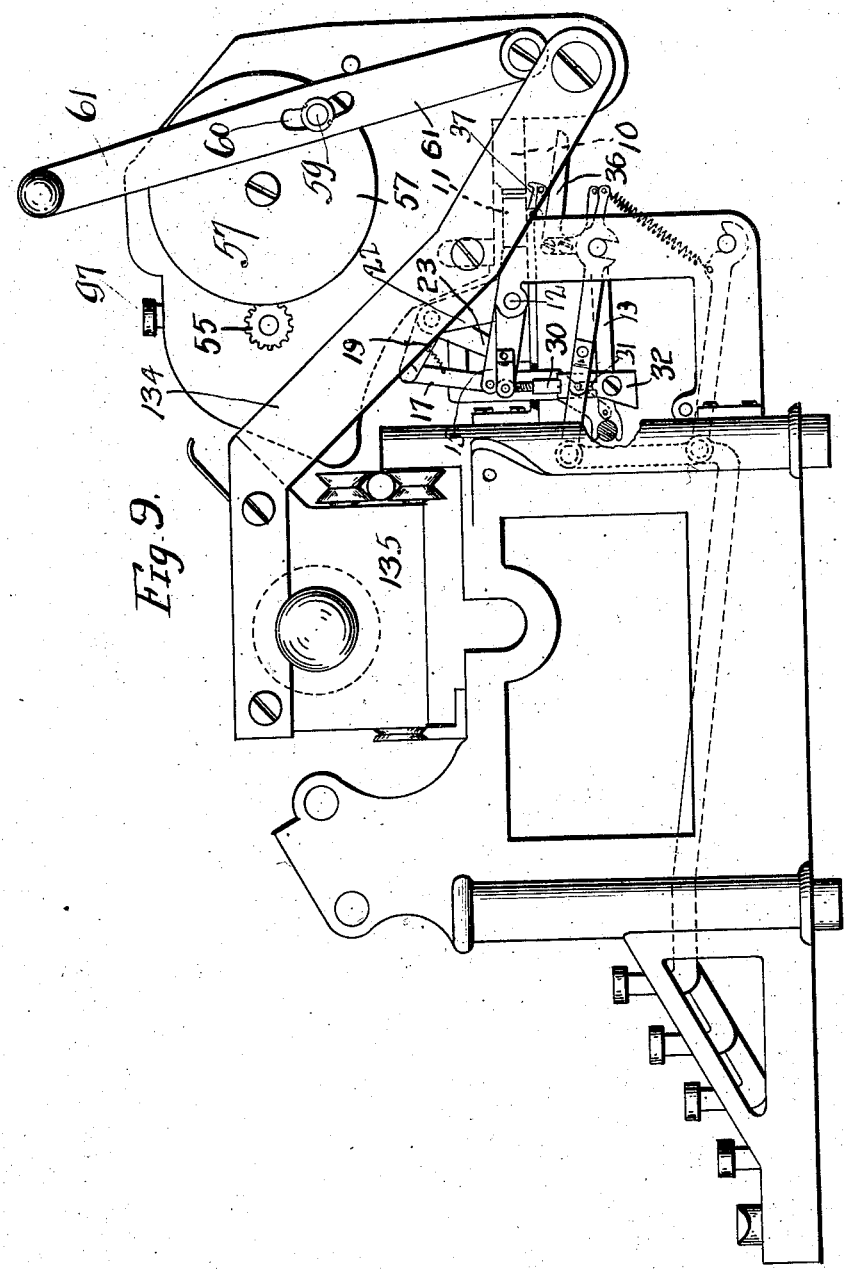

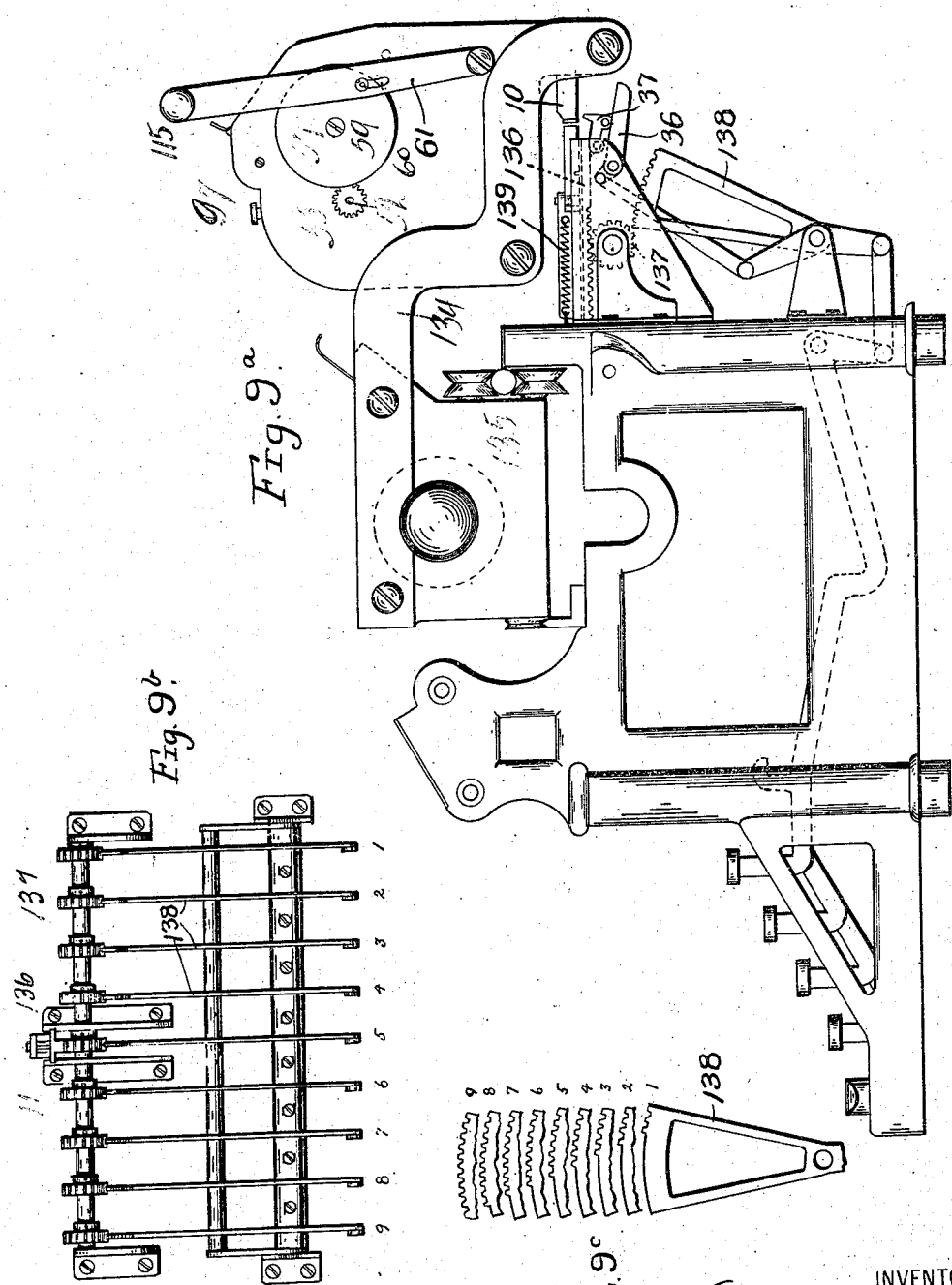

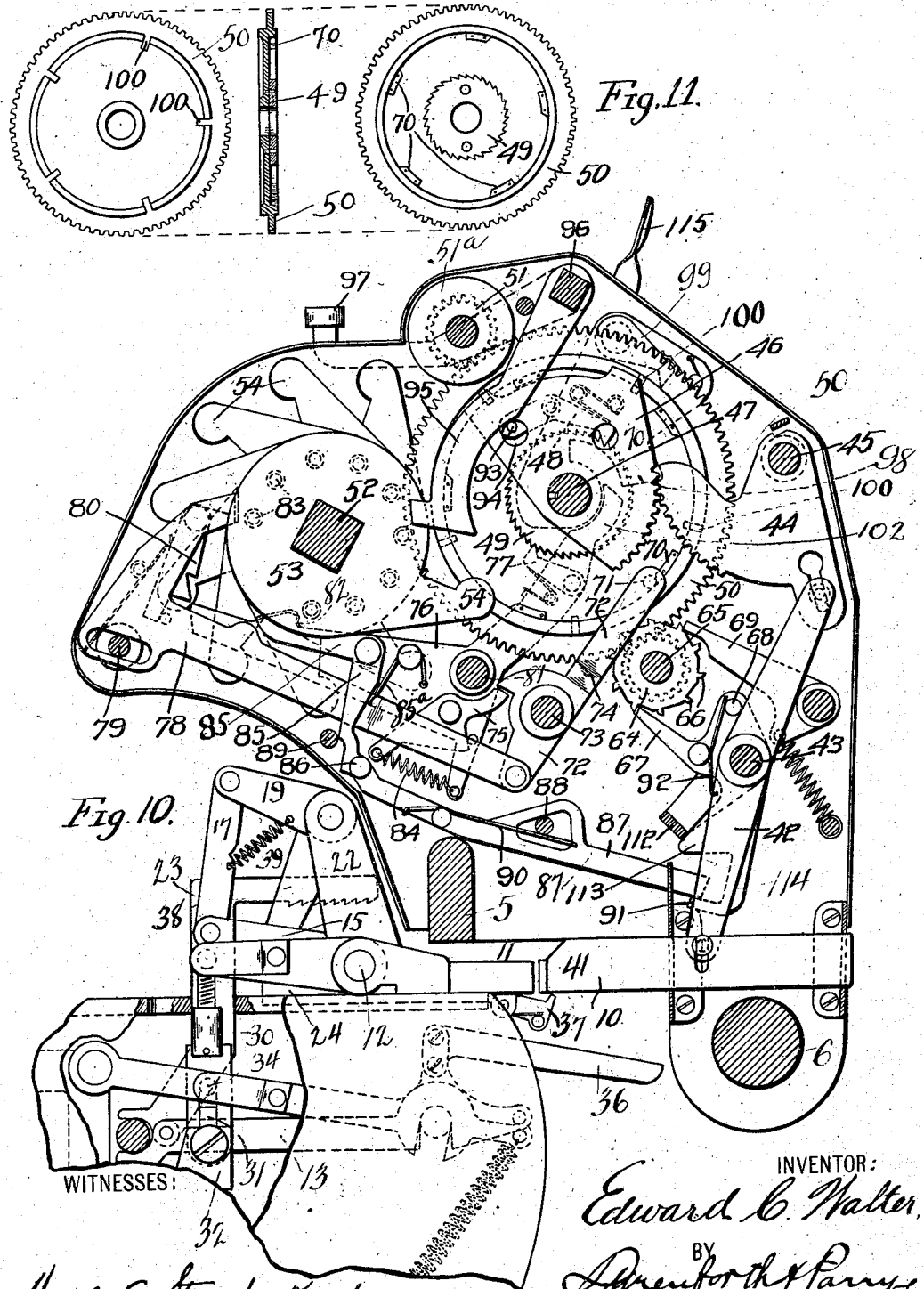

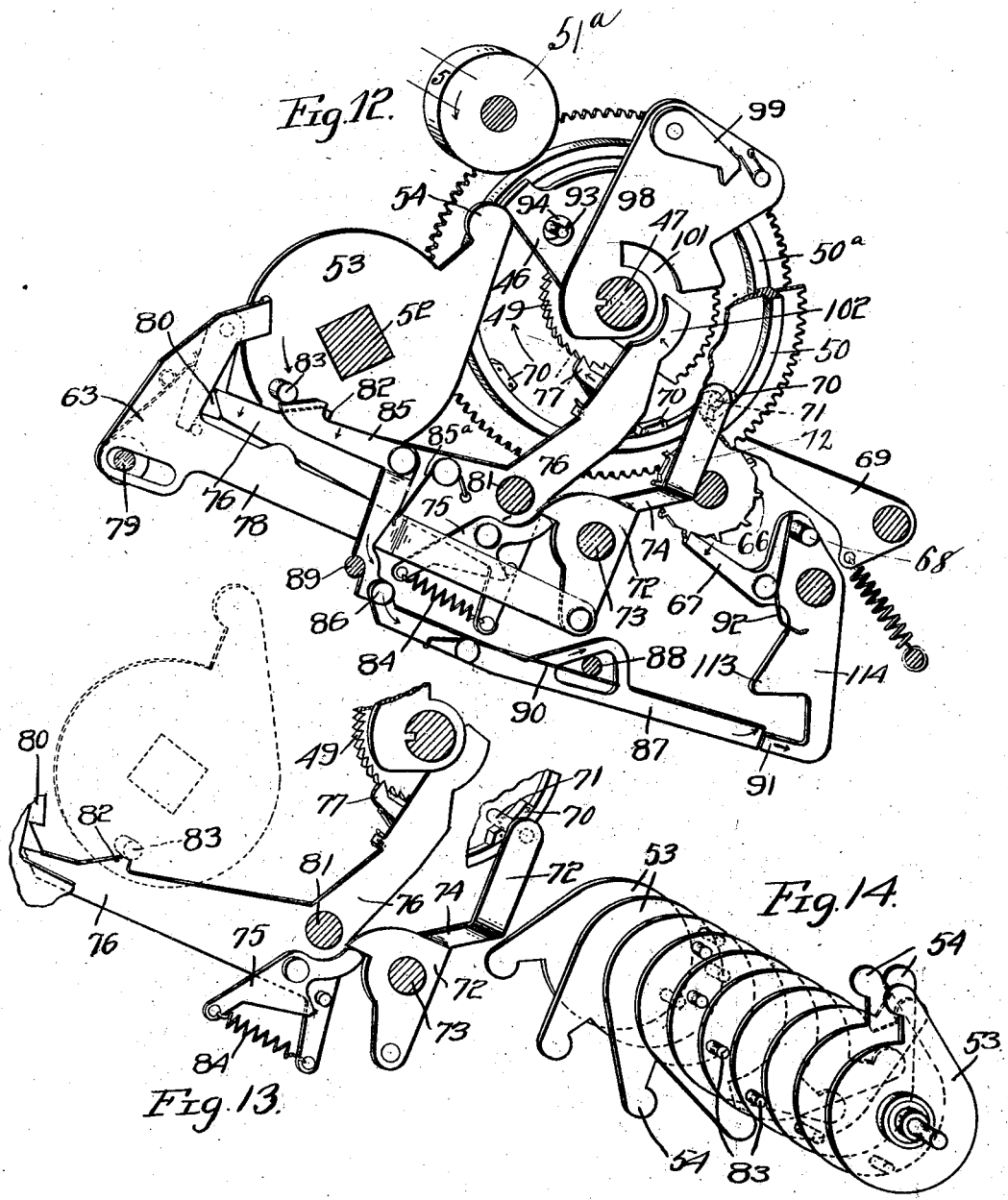

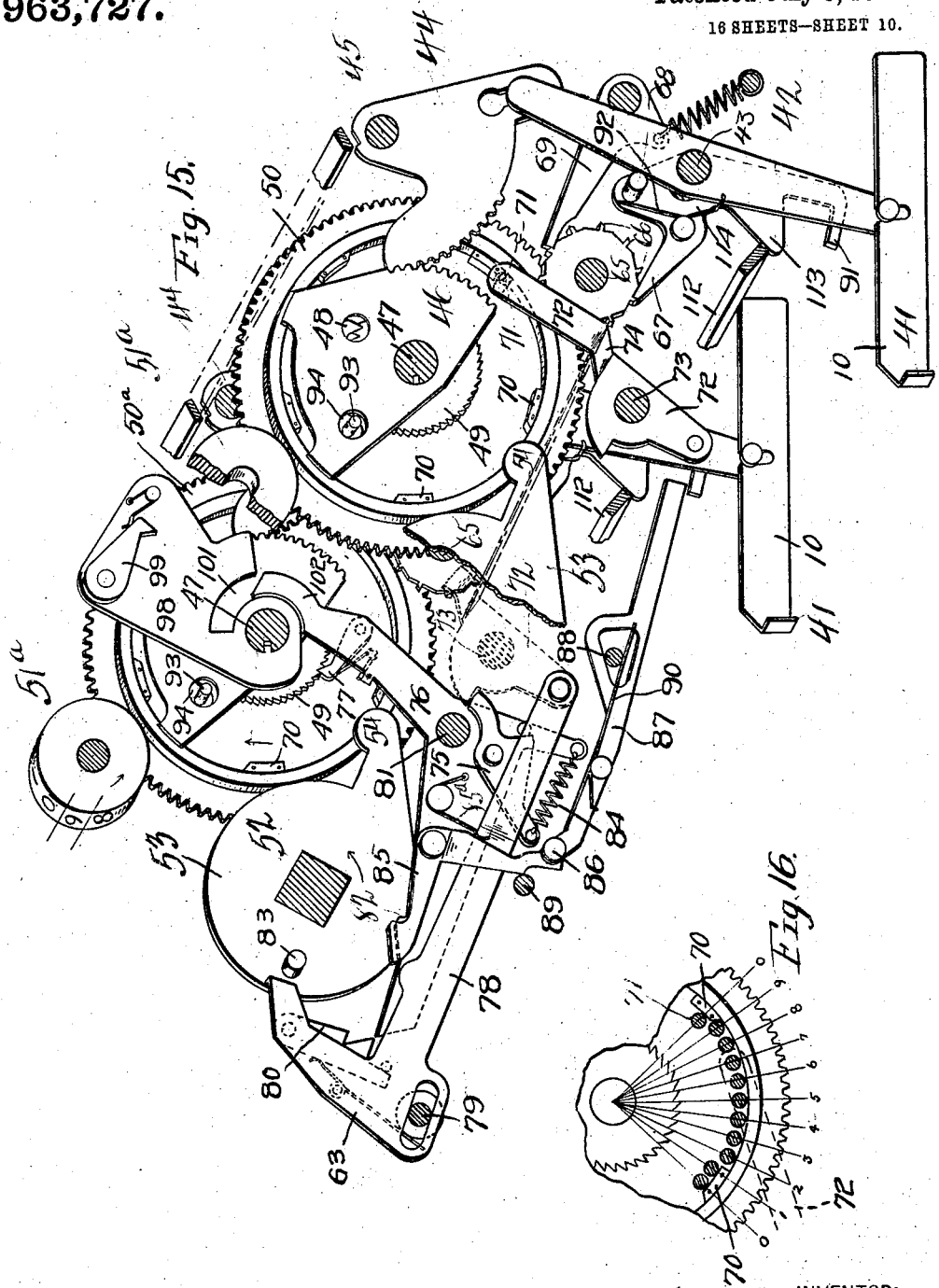

E. C. WALTER.
CALCULATING ATTACHMENT FOR TYPE WRITING MACHINES.
APPLICATION FILED JUNE 18, 1908.

963,727.

Patented July 5, 1910.
16 SHEETS—SHEET 11.

WITNESSES:
Harold E. Stonebraker
Agnes Dunn

INVENTOR:
Edward C Walter
BY
Grenforth & Parry
HIS ATTORNEYS.

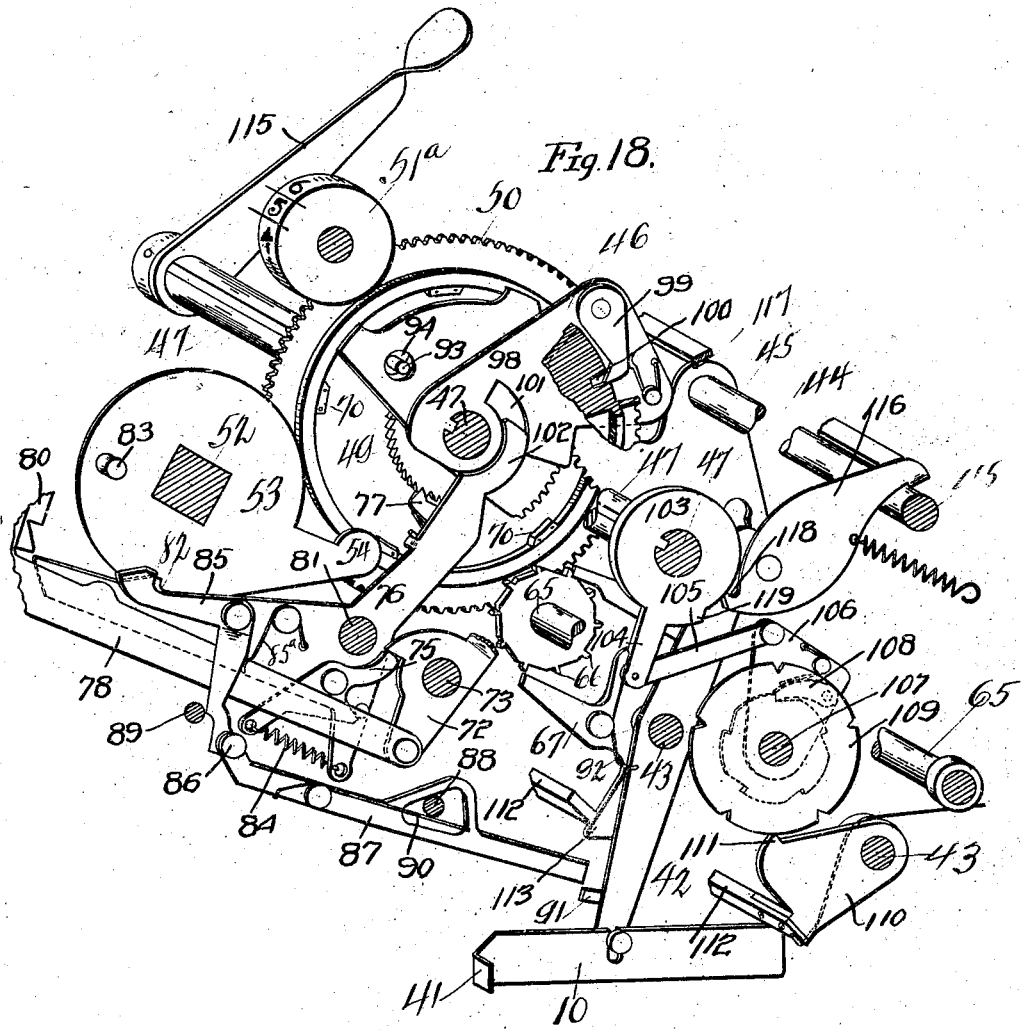

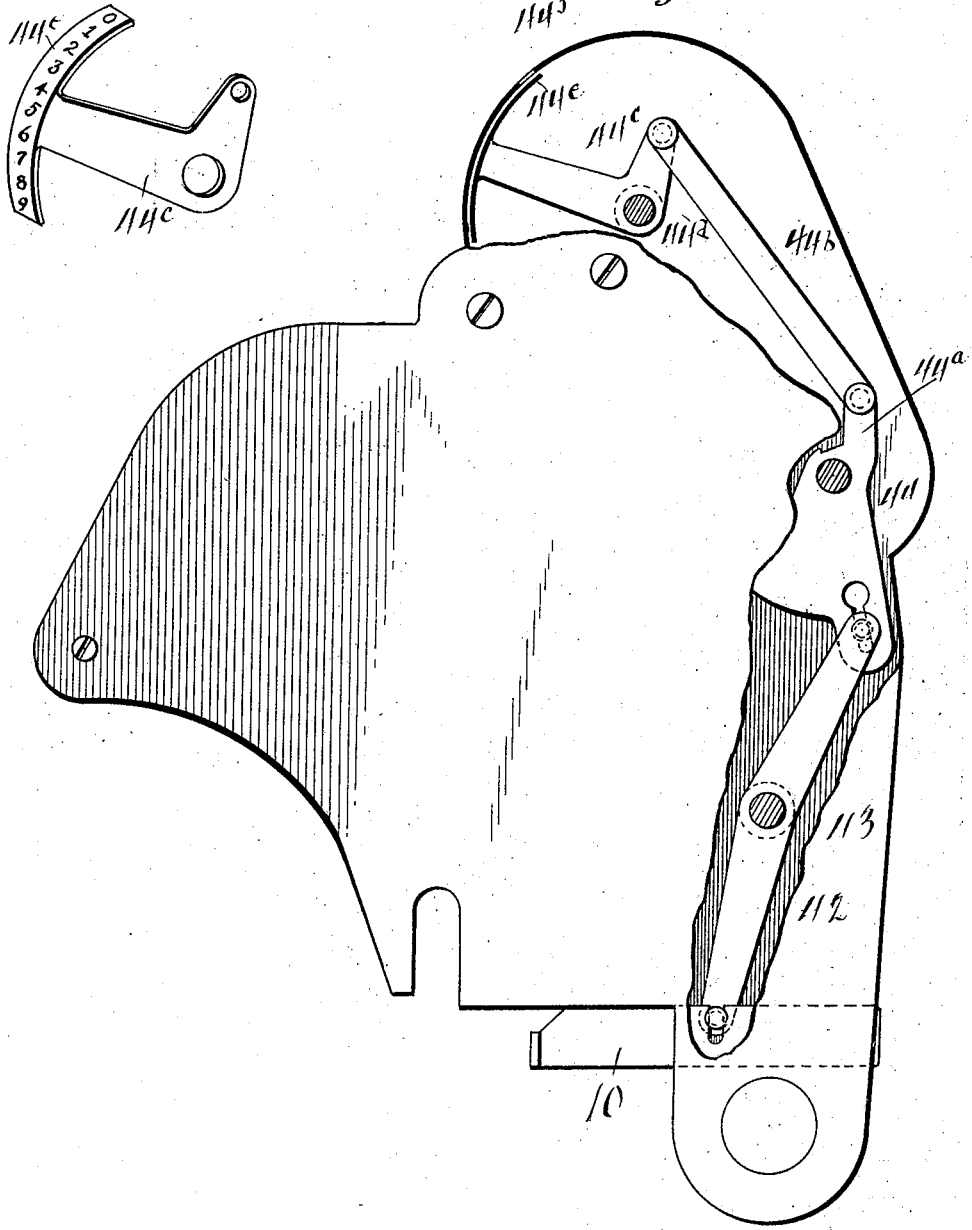

E. C. WALTER.
CALCULATING ATTACHMENT FOR TYPE WRITING MACHINES.
APPLICATION FILED JUNE 18, 1908.
963,727.
Patented July 5, 1910.
16 SHEETS—SHEET 14.
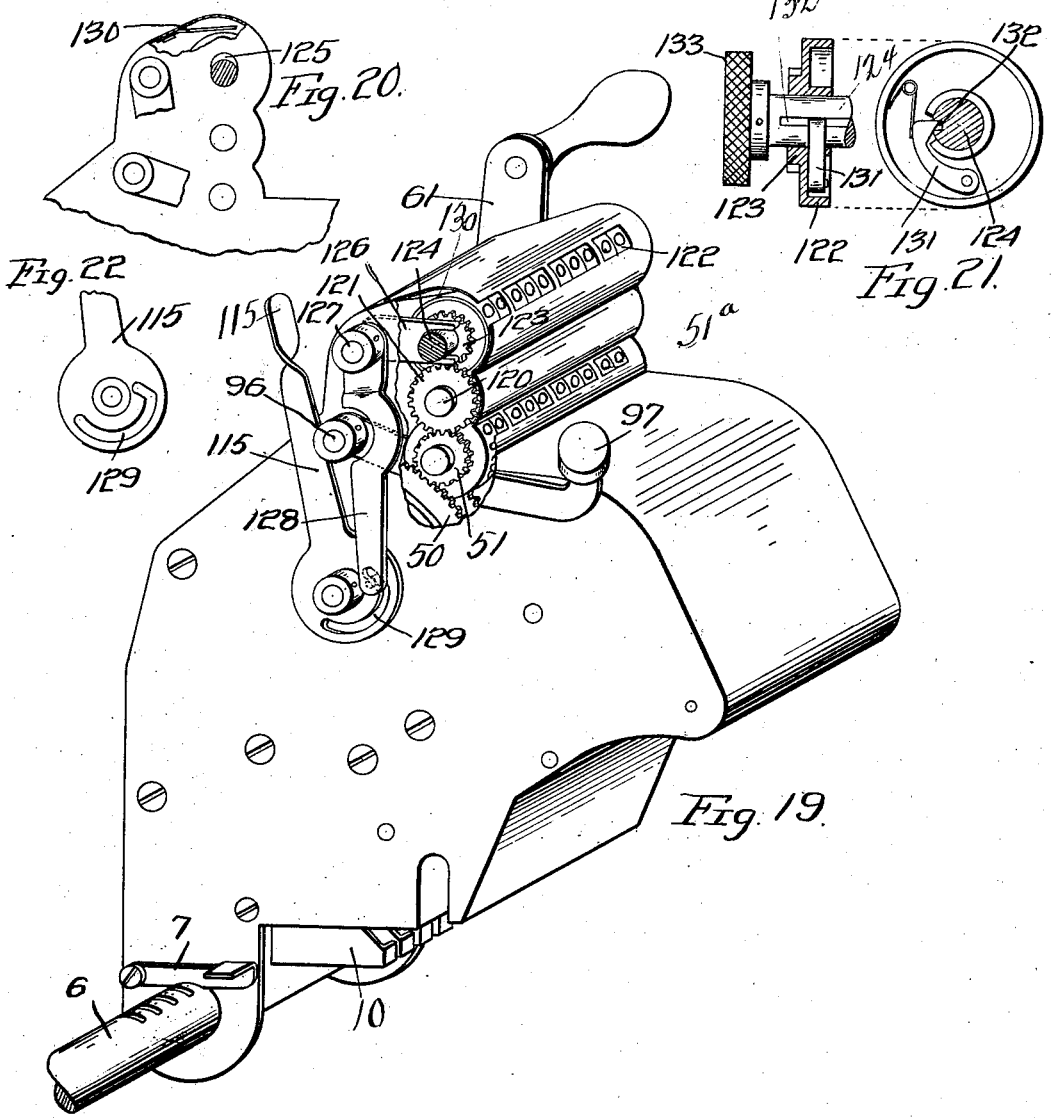

E. C. WALTER.
CALCULATING ATTACHMENT FOR TYPE WRITING MACHINES.
APPLICATION FILED JUNE 18, 1908.

963,727.

Patented July 5, 1910.
16 SHEETS—SHEET 15.

WITNESSES:
Harold K. Stonebraker.
Agnes Quinn

INVENTOR:
Edward C. Walter,
BY
Grenforth & Parry
HIS ATTORNEYS.

E. C. WALTER.
CALCULATING ATTACHMENT FOR TYPE WRITING MACHINES.
APPLICATION FILED JUNE 18, 1908.

963,727.

Patented July 5, 1910.
16 SHEETS—SHEET 16.

WITNESSES:
Harold E. Stonebraker.
Agnes Quinn.

INVENTOR:
Edward C. Walter,
BY
Dyrenforth & Parry
HIS ATTORNEYS.

UNITED STATES PATENT OFFICE.

EDWARD C. WALTER, OF NEW YORK, N. Y., ASSIGNOR TO HARRY T. AMBROSE, OF ORANGE, NEW JERSEY.

CALCULATING ATTACHMENT FOR TYPE-WRITING MACHINES.

963,727.　　　　Specification of Letters Patent.　　Patented July 5, 1910.

Application filed June 18, 1908. Serial No. 439,197.

*To all whom it may concern:*

Be it known that I, EDWARD C. WALTER, a citizen of the United States, residing at New York, in the county of New York and State of New York, have invented certain new and useful Improvements in Calculating Attachments for Type-Writing Machines; and I do hereby declare the following to be a full, clear, and exact description of the invention, such as will enable others skilled in the art to which it appertains to make and use the same.

My invention relates to calculating-attachments for type-writing-machines, and has for its object to provide a device of this character which can be easily adjusted to proper position and quickly and simply operated.

It is the purpose of my invention to construct a calculating-machine which may be secured to a portion of the typewriter structure, so that the typewriter-keys, upon their depression, will cause the positioning of the actuating-elements of the calculator, the final operation of such actuating-elements, to effect a computation, being accomplished by some means independent of the keys, and of the typewriter, itself, such as a hand-lever, for instance.

A further object consists in the novel means employed for obtaining a differential movement of the plunger-operated means for the keys of various denominations, together with the devices used to prevent too great movement of said means and of the particular denominational element operated thereby.

An additional purpose to be attained is that resulting from the improved form of calculator which I employ, the same embodying certain new instrumentalities for resetting any one or more of the denominational actuating-members in case of a mistake, and for setting all the number-wheels to zero-position.

Another object of the invention is the provision of an accumulator, preferably forming a part of the computer, and improved means for operating the same.

Other objects and advantages will be apparent after considering the invention, as set forth in the following description, and fully defined in the appended claims.

My invention, more specifically, comprehends an attachment of the class designated which may be positioned on the line-spacing-carriage of a flat-platen machine, a part of the selecting-mechanism therefor being carried by the letter-spacing-carriage of the machine; and it is to be understood that when I employ the terms " calculating machine " or " calculator," I refer to and intend to include such machines as come under the various titles of adding-machine, register, computer, computing mechanism, calculator, accumulator, totalizer, and the like.

An important characteristic of my machine, and a novelty in the style of typewriters to which my improved computer is particularly applicable, is that the labor of operating the calculating-mechanism to effect a computation is entirely taken off the printing (numeral) keys: In flat-platen machines employing computers, as now being marketed, the printing-key, itself and by itself, is made not only to position the parts of the calculator, but, also, to actuate said parts to turn the denominational-members or digit-wheels to effect a computation, thus entailing a great amount of strain on the printing-key and a different degree of work for each key according to whether it is effecting a movement of a single digit-wheel or a plurality thereof, causing weakening and loosening of the parts, and a heavy and overtaxing burden upon the operator, and, likewise, decreasing the speed of the machine (and, consequently, the usefulness thereof); or, if (to overcome this) the carriage-spring is increased, this further increases the burden upon the operator: As contradistinguished from these structures, the printing-key, in my mechamsrn, simply operates the selecting-mechanism to bring certain instrumentalities in the computer into position with reference to independent operating parts also in the computer, and, then, movement of the denominational-wheels of the calculator (to effect a computation) is accomplished by moving an independent actuating-means, such as a hand-lever.

In the accompanying drawings, I have illustrated a preferred and one of many conceivable embodiments of my invention, it being understood that other embodiments thereof may be utilized and be within the spirit of my invention.

Figure I—is a perspective view of a usual form of flat-platen-typewriter equipped with my improved calculating-attachment;

Fig. II—is a perspective view showing the calculator positioned upon its supporting-bar, and illustrating its relation to the typewriter-scale, and, showing, also, and particularly, the independent means (hand-lever) for effecting computation; Fig. III—is a side elevation, partly in section, of the typewriter-mechanism (in this instance, the line-spacing-carriage) with the calculator attached thereto, and showing, particularly, the part of the selecting-mechanism mounted on the letter-spacing carriage; Fig. IV—is a top plan view of the lower part of the calculator with its supporting-bar, showing the means for effecting a slight adjustment of said bar for proper relation to the letter-space-carriage-rack and scale; showing, also, the top of the letter-space-carriage; showing, also, the part of the selecting-mechanism which is supported on said top; and, showing, also, underlying typewriter-keys, and the levers connecting them with said part of the selecting-mechanism; Fig. V—is a perspective view of the top of the letter-spacing-carriage carrying part of the selecting-mechanism, and showing key-lever connections in detail, and the plunger of the selecting-mechanism; Fig. VI—is an aggrouped detail view of the several turn-buckles of the key-lever connections, showing the different lengths of slots in said turnbuckles, which, themselves, appear of different relative lengths; Fig. VII—is a detail view, in perspective, of the slide and the plunger carried thereby, forming a part of the selecting-mechanism. Fig. VIII—is a detail view, in perspective, of a modified form of means for limiting the movement of the plunger; Fig. IX—is a side elevation showing the application of my improvement to a round-platen machine; Figs. IX$^a$, IX$^b$ and IX$^c$ are views in elevation, and detail, showing a modification of the structure of Fig. IX; Fig. X—is a side elevation of the parts of the calculator; Fig. XI—is a view showing one of the number-wheel-operating-gears, in front and rear elevation, and, in vertical section, disclosing the position of the ratchet-teeth, and cams for operating the carrying-mechanism; Fig. XII—is a perspective view showing the relative positions of two adjacent number-wheel-operating gears, and the mechanism for carrying from one to the other, the part of one gear being broken away; Fig. XIII—is a detail perspective view of a portion of Fig. XII, showing the position of the parts after the carrying-operation, but before the carrying-stud of the carrying-lever has ridden off its cam on the number-wheel-operating-gear; Fig. XIV—is a detail perspective view of the number-wheel-operating-cams, constituting a part of the independent operating-device of the computer, and showing the spirally-arranged projections for effecting a movement of the parts for carrying successively a unit from one wheel to another. Fig. XV—is a perspective view of two adjacent number-wheel-operating-gears, in their entirety; also the parts for carrying a unit from one wheel to the other, the distance between the several elements being exaggerated in this view to bring out the relation more clearly; Fig. XVI—is a detail view in side elevation of a portion of a number-wheel-operating-gear, showing, diagrammatically, the position of the cams thereon with relation to the carrying-stud on the coöperating carrying-lever, (shown in dotted lines); Fig. XVII—is a side elevation of the selecting-mechanism, and showing, also, the resetting-means (or "non-producer") for returning a part of the selecting-mechanism to normal position without effecting movement of the denominational-members, and showing, also, the means (that is, the "zero-producer") for resetting the denominational-members to zero-position; Fig. XVIII—is a perspective view of the parts, showing the zero-producer in operation; and showing, also, the means for locking the number-wheel-operating-gear and, also, devices for releasing such locking-means previous to the operation of the zero-producer; Figs. XVIII$^a$ and XVIII$^b$ are views in side elevation and detail of a selection-indicating-device; Fig. XIX—is a perspective view of the calculator, of the accumulator carried thereby, and of the operating instrumentalities therebetween; Figs. XX, XXI, and XXII are detail views of portions of the accumulator; Fig. XXIII—is a view in plan of the flat-platen, and the printing-mechanism disposed thereover, and showing a plurality of computers disposed in relation to the column of a work-sheet; and Fig. XXIV—is a diagrammatic view, showing a plurality of computers with their individual accumulators attached, and a plurality of work-sheets having a plurality of columns of different headings (such as dollars, weights, etc.).

Referring more specifically to the drawings, wherein like reference-characters refer to corresponding parts: 1 designates the platen of the ordinary flat-platen typewriter as embodied in the Donning machine, which is here shown for convenience of illustration of the present invention.

2 are the track-rails, and 3 the line-spacing-carriage mounted to travel upon the aforementioned track-rails.

Mounted to travel horizontally on the line-spacing-carriage 3 is the letter-spacing-carriage 4, which is provided with the usual printing-keys, spacing-levers, tabulator, and other devices commonly employed on a flat-platen machine.

The calculator is preferably mounted adjustably on the rear rail 5 of the line-spacing-carriage, and on the shaft 6, which latter is provided with the horizontally-arranged rack-teeth, as shown clearly in Figs. II and XIX.

As shown in Fig. IV, the shaft 6 is provided, at its ends, with adjusting-means, in the form of adjusting-screws threaded into internally-threaded holes in holding-screws in the ends of the shaft. By this means, I am enabled to effect a fine adjustment of the calculator-supporting-shaft to insure its proper relation (and, thus, of the rack-teeth thereon) to the letter-space-rack of the machine and the graduations on the letter-space-scale. Pivoted on the side of the calculator is a latch 7, which is adapted to coöperate with the teeth on the shaft 6 and securely maintain the calculator in any predetermined position relative to the carriage and its spacing. 8 is an indicator preferably carried by the calculator and alining with the scale 9 on the typewriter-frame, thus enabling the determining of the exact position of the calculator-attachment with respect to the column of the work-sheet, as well as forming a means for locating the carriage at any denominational position in that column.

A designates a billing-sheet positioned upon the platen to receive the desired tabulated matter. Also supported on the platen, and preferably at one side thereof, is a tally-sheet B which may be employed to keep a memoranda of each individual bill, so that the number and amount of bills sent out during the day, or other period, may be determined at a glance. If it is desired to register the numbers which are being printed at a certain portion of the billing-sheet, or other writing-surface, the calculator is moved along the shaft 6 until the indicator 8 is at the proper position relative to the typewriter-scale 9, after which the latch 7 is dropped into the proper notch and the calculator is firmly positioned for operation.

*Selecting-Mechanism.*

(1.) *Actuating-mechanism between printing keys and the selector.*—The calculator includes a series of selectors or selecting-levers 10, which are arranged to be successively engaged by a plunger 11 on each stroke of a numeral-key as the carriage travels laterally across the printing-surface. The plunger 11, is carried by the carriage 4; and therefore I will now proceed to describe the manner in which a differential movement is imparted to the plunger upon the depression of any of the numeral-keys of different degrees, (as shown in Figs. III, IV, V, VI, VII, VIII and X), whereby a differential movement of the selecting-elements of the calculator is effected: Journaled in suitable brackets on the carriage are the plunger-operating-shafts 12, 12, to the inner ends of which are fixed the arms 14 and 15. Pivoted to the arms 14 and 15 are links 16 and 17, to which is connected a bell-crank-structure preferably comprising the arms 18 and 19, the sleeve 20, and the arm 23. Brackets 21 and 22 are provided for supporting, at their lower portions, the plunger-operating-shafts 12, 12, and, at their upper portions, the said bell-crank-structure, the arm 23 of which has an elongated slot at its lower end. The arm 23 has its lower end loosely connected in a bifurcated portion of the slide 24, the slot in said arm allowing a swinging movement of the arm 23 and a straight movement of slide 24.

The plunger 11 is preferably pivoted to swing laterally in one direction only upon the slide 24, and is held against movement in the other direction by a pin 25, a suitable spring 26 maintaining it against the pin. This permits movement of the plunger 11 in a direction opposite to that of the normal movement of the carriage, so that should the escapement mechanism operate to move the carriage before the plunger has been fully returned to proper position, the plunger will yield when it strikes one of the levers 10, and therefore permit free movement of the carriage without binding, and without breaking or bending of the parts. By omitting the pin 25, and providing a spring similar to spring 26 in place of the pin, the plunger may have a yieldable movement in either direction, in case it is desired to obviate any chance of the plunger striking the levers forcibly, upon the return movement of the carriage.

Fixed upon the plunger-operating-shafts 12, 12, are arms 27, and, adjacent each fixed arm, is a loosely-mounted arm 28, carrying a pin 29 for engagement with the end of the corresponding fixed arms. Pivotally mounted at the outer end of each arm 28, is a turn-buckle 30, having a slot 31 in its lower portion, and provided at the bottom with a stop 32, adapted to engage the abutment 33 and limit the downward movement of the turn-buckle. Each key-lever is provided with a pin or suitable projection 34, engaging in the slot of its respective turn-buckle and serving to depress the same whenever the key is operated. There are as many turn-buckles as there are numeral-keys, namely nine, and the slots are all of different lengths, that for number "nine" being the shortest, that for number "one" being the longest, and the others varying regularly and successively between these limits. The slot for number "one" key-lever being very long, the key-lever moves down a considerable distance before its pin engages the bottom of the slot, and thus the extent of movement of the turn-buckle is comparatively slight; whereas, in the case of number "nine" key-lever, the slot being short, there is very little lost-motion and a corresponding increase in the extent of movement of the turn-buckle. The movement of the turn-buckles being communicated through arms 28 and 27, plunger-operating-shaft 12, arm 14, link 16, arm 18, sleeve 20, arm 23, and slide 24, to plunger 11, it will be seen that the extent of movement of plunger 11 is in exact correspondence with the numeral being printed: Inasmuch as the plunger 11 is the means for moving each of the selecting-levers 10 to position the part of the selecting-device in the calculator for engagement and actuation by an independent operating-mechanism (presently to be described) for actuating the denominational-wheels of the calculator, to produce a computation the different levers 10 will be moved greater and lesser distances, respectively, and the selecting-devices be positioned accordingly, to be moved then, by said independent operating-mechanism to effect movement of the number-wheels, one increment for number "one", two increments for number "two", and so on up to "nine", as will all be more fully disclosed hereinafter.

36 designates an extension on the usual ribbon-guide-drive-link 13, or any other constantly-oscillating part of the machine, which is thrown up upon each actuation of a key-lever to engage a preferably spring-controlled latch 37 pivoted in slide 24 (see Figs. X and XVII). The latch 37 when moved engages behind the front end of lever 10, and locks the same to move with the plunger 11, thus preventing inaccurate or too great movement of the selecting-levers 10 which set the actuating-devices in the calculator. It is to be understood, of course, that this locking-catch moves along as the carriage travels across the printing-surface, and acts in the same manner, successively, on each different selecting-lever 10 after each spacing-movement takes place.

Pivotally mounted on the other end of the ribbon-guide-drive-link, or other suitable part, is a lever 38 having a forward projecting arm 39 at the top, the lower edge thereof being provided with a plurality of ratchet-teeth (Figs. V, X, and XVII). Coöperating with the aforementioned ratchet-teeth, is a pin 40 having an angular upper edge, on the side of the slide 24, which is arranged to be engaged by one of the teeth, according to the denominational selection taking place, to prevent excessive forward movement of the entire selecting-mechanism. The parts are so positioned and related that upon the downward movement of arm 39, for numeral-key "one", the pin 40 will be held by the first tooth, and for numeral-key "two", by the second tooth, and so on. As the action of the ribbon-guide-drive-link 13 is always the same, the lever 38 and arm 39 will always have the same movement, insuring accurate stopping of the movement of the selecting-mechanism at the proper point to accord with the numeral being selected. Although the movement of arm 39 is always the same, it must be remembered that in the same time that it comes down to engaging-position, the plunger 11 passes through variable paths for different keys, namely, a distance of one increment for key number "one", two increments for key number "two", and so on, this differential movement of the plunger being effected by the mechanism previously described. It will be noted that there are only eight teeth on the rack face of the arm 39, for the reason that nothing is needed to prevent excessive movement when key number "nine" is depressed, for this should properly actuate all the parts to the limit of their movement. This lock is employed primarily for rapid writing, such being the only time that there is a tendency toward too great movement: When writing at ordinary speed, the selecting mechanism will operate satisfactorily without any locking instrumentalities such as that just described.

In lieu of the plunger-locking means just described, I may employ a slightly different device and limit the movement of the plunger-operating-shaft, and which modified device, accomplishes the same purpose as shown in a detail view in Fig. VIII, which I will now explain: As stated before, each loose arm 28, in its downward movement, engages an arm 27 by means of the pin 29, and the arm 27, being fixed on the shaft, the movement of the arm 28 is communicated to the shaft and other elements in the succeeding operations. Pivoted at the outer end of arm 28 is a right-angled catch 36ª, which is shown in normal position in Fig. VIII where the horizontal arm of the catch is in engagement with a stationary abutment 34ª on a projection on the top of the letter-space-carriage. There is one of these abutments 34ª for each catch, but such abutments are arranged in pairs, the abutments for each two adjacent catches being carried by and integral with an arm which is secured to the top of the carriage, as before stated. The downward extending arm of the catch is provided at the bottom with a nose 35, which is arranged to engage under the end of the arm 27 and lock it with arm 28 as it moves downward. As soon as the arm 28 commences its movement, the horizontally-extending arm of the catch is carried away from the stationary abutment 34, and a suitable spring 36ᵇ throws the catch upward on its pivot, causing the nose 35 to engage under the arm 27, and hence the fixed arm 27 can move no farther than the loosely-mounted arm 28, the movement of which is limited through slot 31 and abutment 33. Upon the return or upward movement, the two arms move together until the catch strikes abutment 34ª, when it moves away from engagement with the arm 27, leaving such arm free to move upon the actuation of any one of the other numeral keys.

*The Calculating-Attachment.—Selecting-Mechanism.*

(2). *Selected-mechanism between the selector and the number-wheel-operating-gear.*—The selecting-mechanism here employed is the same for each denominational-wheel, ten of which are shown in the present embodiment, and a description of one selecting-mechanism for one denominational-wheel will, therefore, suffice for all: The selector or selecting-lever 10, by which the parts are selected for actuation, has, in this embodiment, a right-angled extension 41 against which the plunger 11 abuts to move the lever 10 the proper distance. Pivoted to lever 10 by a pin-and-slot connection, is a rock-arm 42, journaled on shaft 43. The other end of this rock-arm is similarly connected to a selector-plate 44, which is journaled on shaft 45, and has a toothed segmental portion arranged to mesh with the pawl-carrier 46 loosely mounted on main-shaft 47, whereby the pawl 48 is moved over the ratchet-wheel a distance of one tooth for number "one", two teeth for number "two", and so on.

I have now described the mechanism of my construction whereby a selection is obtained in the calculator. I will now describe the operation of the selected-mechanism for producing a computation:

*Independent operating-mechanism for effecting computation.*—This mechanism comprises, primarily, a shaft 52 which carries a series of cam-plates 53 fixed thereon; one cam-plate being provided for each of the number-wheel-mechanisms presently to be described. The cam-plates are so positioned on the shaft that their projecting ends 54 form a spiral-arrangement (see Figs. X, XIV and XVII) for a purpose presently to be described. Shaft 52, in this embodiment, carries at its outer end a pinion 55 (see Fig. II) with which meshes a large gear mounted on the outside of the casing of the computer. This large gear has attached to it a four-toothed ratchet-wheel 56, and, adjacent thereto, is a plate 57 upon which is mounted a spring-pawl 58 for engagement with the teeth of ratchet-wheel 56. The plate 57 also carries a pin 59 arranged in a cam-slot 60 of the lever 61 which is provided with a suitable handle. 62 is a spring for holding the lever in, and returning it to, its normal, raised position. The slot 60 is of such length that depression of the lever will permit its proper travel to rotate the ratchet-wheel 56 and its gear the distance between two teeth, and turn the pinion 55 and the shaft 52 one complete revolution. The handle, and the ratchet 56 and its gear, and the pinion 55, and shaft 52, constitute an actuating-mechanism for the independent operating-mechanism consisting in this instance of the cams 53.

I have now described, first, the selecting-mechanism which, only, is operated by the key-levers; secondly, the selected-mechanism positioned thereby; and, thirdly, the independent operating- and actuating-mechanisms which act, (and which are the only mechanisms which act) upon the selected-mechanisms to effect a computation. I shall now describe the elements which are affected by the action of these independent operating- and actuating-mechanisms to produce a computation.

*Computation.*—The ratchet-wheel 49 is carried by the main-gear 50 which meshes with a pinion 51 on the side of the number- or sight-wheels 51ª. The selected-mechanism, already referred to, being now in position to be acted upon, the independent operating- and actuating-mechanisms, also referred to, are moved to cause the cam-plates 53 to engage their respective pawl-carriers 46 and perform a dual function, namely, to return said pawl-carriers to normal position, and, simultaneously, effect movement of the number-wheels to indicate the proper numbers, each one in accordance with the numerical selection made. The movement of the cam-plates 53 as they return the pawl-carriers to normal position and register the desired numbers, also serves to return all the parts employed to position the pawl-carriers 46 in their normal position.

In order to prevent excessive and overthrow movement of the gear 50 and thus, rearward movement thereof, I provide the following devices: A gear 64 (Fig. X) is journaled on shaft 65 and meshes with the main-gear 50. The gear 64 also carries a plurality of ratchet-teeth 66 which are engaged by a spring-pawl 67 pivoted on the shaft 43, and provided with a pin 68 abutting the rock-arm 42. A spring 92 impinges against the pin 68 to hold it against rock-arm 42 and, thus, constitutes a yielding engagement between the pawl 67 and the rock-arm 42, for reasons which will presently appear: The pawl 67 normally is in engagement with one of the teeth 66, thereby locking the gear 50 against forward movement (see Fig. X); but, when the lever 10 is moved inward, the rock-arm 42, swinging on shaft 43, carries pawl 67 away from its ratchet-wheel. When one unit is selected, the rock-arm 42 carries the pawl away from locking-position only a short distance; when two units are selected, it will carry it away a slightly greater distance; when three units are selected, still farther; and so on up to nine units. Upon the actuation of the independent operating-instrumentalities to register the number and return the parts to normal position (as described) the pawl is carried back and reëngages to lock the gear 50 after it has been given the proper extent of movement. 69 is another spring-pawl engaging the other side of the ratchet-teeth to prevent any retrograde movement of gear 50.

*Automatic carrying mechanism.*—It is, of course, necessary to provide, in devices of this kind, some means for carrying the tens-unit from one number-wheel to the next number-wheel in order: It is a feature of my invention to effect such carrying, (not simultaneously with the action of the number-wheel and its main-gear) but subsequent thereto and, successively, following the action of each main-gear, which feature has the advantage of insuring absolute and accurate action.

Referring to Fig. XII and those figures immediately following, 50 designates the operating-gear for the number-wheel of lower denomination, and 50ª the operating-gear for the number-wheel of next higher denomination. Secured upon the surface of each operating or main-gear 50 are five cams 70, spaced at equal distances. In the path of the cams 70, is a pin or projection 71 carried by a lever 72, which is loosely mounted on shaft 73. Centrally of said lever 72 there is a right-angled offset portion 74, so that the upper and lower portions of the lever are in different vertical planes, such planes being on opposite sides of the gear 50. The lever 72 engages a yieldable latch 75 mounted upon the carrying-arm 76. Referring more particularly to Fig. XII, it is to be noted that the pin 71 upon lever 72 lies in the path of the cams on gear-wheel 50; whereas, the latch 75 and the carrying-arm 76 on which the lever 72 operates, are devices coöperating with the next adjacent gear-wheel 50ª, that is, the gear-wheel operating the number-wheel of next higher denomination. Pivoted upon the other side of the carrying-arm 76 is a spring-pawl 77 which is positioned to engage the teeth of ratchet-wheel 49 for a purpose presently to be made clear. Connected to the lower end of lever 72, is a lever 78, which is slidably mounted on shaft 79, and carries a spring-operated catch 80 for engagement with the outer end of the carrying-arm 76.

The cams 70 are so positioned on gear 50 that when the number-wheel is registering "zero," a following cam is nine spaces or units away from the pin 71 on the lever 72. When the number-wheel is registering one unit, said following cam is eight spaces or units away from the pin 71, and so on up to the time the number-wheel is registering nine units. It is then that the cam has reached such a position that, upon adding another unit, the pin 71, of lever 72, will ride up on cam 70 and rock the lever 72 on shaft 73. The carrying-arm is loosely mounted on shaft 81, and, when the pin of lever 72 rides up on said following cam 70, the upper end of latch 75 is actuated, thereby rocking the carrying-arm 76 sufficiently for the pawl 77 to slide over ratchet-wheel 49 the distance of one tooth. (See Fig. 16.) This operation is shown in the transition from Fig. X to Fig. XII. At the same time that pawl 77 is moved the distance of one tooth, as just described, an abutment 82 on the carrying-arm 76 is projected into the path of stud 83 upon the cam-plate 53, and, upon the continuation of the movement of the cam-plate, the stud 83 engages the abutment 82, forcing down that portion of the carrying-arm 76, and rocking the same on shaft 81, as a result of which the pawl 77, in engagement with ratchet-wheel 49, moves said ratchet and, together with it, the number-wheel-operating-gear 50ª a distance of one unit, thus causing its number-wheel to advance one unit.

The parts just described connect each number-wheel-mechanism with the one adjacent on the left through the medium of arms 72, so that when the cam-plates 53 are revolved by the independent operating- and actuating-mechanisms, already described, (and including the hand-lever 61), a carrying will take place provided any of the number-wheels have been actuated to register "zero," (thus bringing the devices, just explained, into operation to move the next adjacent wheel), and the studs on the cam-plate will engage the respective carrying-arms and move the corresponding number-wheel a distance of one unit. The camplates are positioned on shaft 52 to cause their ends 54 to form a spiral arrangement, so that, when the shaft 52 is turned, the pawl-carriers 46 will be operated successively, starting with the first two on the extreme right, (there being no carrying-mechanism for the first number-wheel) and, in like manner, the studs 83 are arranged spirally (see Fig. XIV) in order that the carrying-arms may also be operated successively from right to left and succeeding the operation of the pawl-carriers 46 after the respective main-gear has come to rest. By arranging the studs spirally, it permits a right-hand number-wheel to carry to the left one unit, before the next carrying-arm begins to operate. It is to be understood that, for obvious reasons, I prefer to employ the spiral arrangements; but it is manifest that I may substitute a different arrangement.

The cam 70 is of such a length that the pin 71 remains upon it for a distance of two units or more, and it may happen that it is necessary to carry from one wheel to another while the pin is in this position, and means must be provided to prevent break-ing or straining of any parts: To this end and purpose, I pivot the latch 75, as before stated, so that in case the carrying-arm 76 is forced down while the lever 72 is still riding on cam 70, the spring 84 yields, the parts taking the position shown in Fig. XIII, with the lower tooth of latch 80 engaging over and locking the carrying-arm 76 until lever 72 rides off of cam 70. The spring 63 which holds latch 80 in position also serves another function, namely, to assist in holding the levers 72 and 78 in proper position by resting against shaft 79.

On account of the diminutive size of the structure and the limited movement of the parts thereof, and, particularly, of the main-gear 50 in its travel for one unit, it is desirable to have the pin 71 rest upon the cam 70 for more than one space, for the reason that the cam, if made smaller, would rapidly wear and be rendered inoperative. Of course, the unital movement of the main-gear could be enlarged to such an extent that the pin 71 would rise and fall within one space, making it obvious that my structures contemplate the use of both arrangements, namely, the resting of the pin on the cam for more than one unital space, or for rising and falling within the one unital space. In the latter event, I may dispense with certain parts of the structure associated therewith.

*Lock-releasing-means for carrying-mechanism.*—In order to permit the carrying-mechanism to move its respective number-wheel one unit, some means is required to release the locking-pawl 67 to permit gear 50 to move, and this I accomplish in the following manner: Pivoted on the carrying-arm 76 is a spring-pressed angle-arm 85, and pivotally connected to this angle-arm, at 86, is a lever 87 having a triangular slot to engage shaft 88. A stop 89 prevents movement of the angle-arm 85 when the carrying-arm 76 is in its normal position. When the carrying-arm is projected up into the path of stud 83, (see Fig. XII) the angle-arm 85 is carried with it and is also moved into the path of such stud, this movement of the angle-arm being effected by a spring 85$^a$ secured to the carrying-arm.

The previously-described locking-pawl 67 is part of an integral-plate which has a forward extending shoulder 91 at its lower end. The normal relative position of shoulder 91 and lever 87 is shown in Figs. X, XV and XVIII, where the lever is lying just above the shoulder; but, when the angle-arm 85 moves upward with the carrying-arm 76, the lever 87 is carried forward and drops down in front of shoulder 91, as shown more clearly in Fig. XII. Then, when the stud 83 strikes the carrying-arm to move the same, it also engages the angle-arm 85, moving it downward and, in turn, forcing lever 87 rearward against shoulder 91. This results in the pawl 67 turning slightly on its pivot 43 momentarily to disengage it from the ratchet-teeth on the locking-wheel 64 and permit the gear 50 to be moved a distance of one unit, during which operation the pawl 67 moves back into its normal or locking-engagement under the influence of its return-spring 92.

*Resetting devices.*—In case a mistake is made in the selection of the amount to be added, I have arranged certain devices which will enable the parts to be moved back to their starting-point without effecting a computation. The main actuating-pawl 48 on the pawl-carriers 46, has a pin 93 fixed upon its tail-piece and extending through an opening 94 in the said pawl-carrier 46. The pin 93 lies adjacent to and in the path of movement of arm 95 which is securely fastened on shaft 96, there being as many such arms on the shaft as there are sets of number-wheel-operating-gears in the calculator. Connected to the shaft 96 is a key 97. When the key is depressed, it moves the arm 95 against pin 93, rocking the pawl 48 out of engagement with ratchet-wheel 49. While the key 97 is thus being held down to move the actuating-pawls 48 out of engagement, as just described, the independent operating- and actuating-mechanisms, (including the hand-lever 61), are operated to return the selected-mechanism to normal position. A suitable spring 97$^a$ may be provided to return the key 97 and the arms 95 to normal position, this spring operating, at its upper end, against a pin 97$^b$ on the arm 95, and looped around shafts 73 and 81.

It is obvious that, by multiplying the keys 97 and mounting the arms 95 loosely on the shaft 96, and connecting each key to its corresponding arm 95, I would be enabled to operate any individual selected-mechanism, without affecting any other selected-mechanism, whereby an erroneously-produced selection could be corrected.

*Zero-producing means.*—In order to move all the number-wheels to zero-registering position, the devices which are now about to be fully set forth, are utilized.

Splined on the shaft 47 is a plate 98, which for convenience I will term the "zero-producer". This plate carries a spring-pawl 99 (see Fig. XVIII), which is adapted to engage one of a series of notches 100 (see Figs. XI and XVIII) arranged in the circular flange on the side of the adjacent gear-wheel 50 and to turn the gear in order to move the number-wheel to zero-registering point. It is further provided with a radial recess 101, so that as soon as the shaft 47 is turned to operate the zero-producer, the curved end 102 of the carrying-arm 76 is engaged by the walls of the recess 101, and the carrying-arm is thereby prevented from operating when a cam 70 rides under the pin on lever 72. Also splined on the shaft 47 is a cam-plate 103, having an arm 104 projecting from one side and connected to link 105. In turn, pivotally connected to the link 105 is a plate 106, journaled on the shaft 107, and carrying the spring-pawl 108. Mounted on the shaft 107 is a peripherally-notched disk 109 having a series of ratchet-teeth formed on the side adjacent the pawl 108 and adapted to be engaged thereby.

110 is a releasing-member provided with a beveled nose 111 normally lying in one of the notches in disk 109. To the lower edge of the releasing-member 110 is secured a longitudinally-extending bar 112, which lies across and abuts the lug 113 on each locking-pawl-carrying-plate 114. As long as the zero-producer remains in normal position, the nose 111 lies in a notch of the disk 109, and the bar 112 is held up sufficiently high to disengage it from the pawl 67 and permit said pawl to engage with a tooth 66 in the wheel 64; (see Fig. XV); but, as soon as the zero-producer is operated, pawl 108 engages a tooth on the side of disk 109, and partially rotates the disk, thereby carrying the notch away from engagement with nose 111, and causing such nose to ride out on the periphery of the disk. This depresses the plate 110 and also bar 112, and, as such bar 112 is abutting the locking-pawl-carrying-plate 114, this plate is also lowered, and the pawl 67 is moved out of engagement with a tooth 66, as long as disk 109 is making one-fifth of a revolution. Operating-lever 115 is splined to shaft 47, and constitutes the means by which such shaft is rotated to turn the several zero-producers and move all the number-wheels to zero-registering position.

Owing to the proximity of the parts, there is a certain amount of friction between the zero-producer 98 and the adjacent selector-plate 44, which friction has a tendency to move the selector-plate upon the return movement of the zero-producer. To obviate this, I employ a spring-operated locking-plate 116 arranged to engage a notch 117 in the selector-plate and hold the same against movement while the zero-producer is operating. As soon as the zero-producer reaches its normal position, a tail-piece 118 on plate 116 rides up on cam 119 and moves the plate out of locking-engagement, thus leaving the selector-plate 44 free for operation. A suitable spring may be provided to return the lever 115 and plates 98 to normal position.

*General operation.*—When it is desired to print and add a column of figures, the proper numeral or denominational-keys are operated successively, as is customary in a typewriting-machine: Each numeral or denominational-key, on moving downward, causes that particular denominational-selection to take place in the calculator, through the interposed instrumentalities, already described and enumerated in the following statement of operation:

First: The key, on its downward movement, operates the selecting-mechanism, heretofore defined; and, in the first instance, the key moves its respective turn-buckle a predetermined or denominational distance, which turn-buckle, in turn, causes the plunger-operating-shaft 12 (through the medium of the arms 27 and their connected parts) to move the plunger 11 a predetermined or denominational distance.

Second: The plunger 11, being positioned by the traveling-carriage to make a lateral denominational-selection in the calculator and having been actuated by the described movement of the key, engages its proper lateral denominational-selector 10 of the calculator, which, in turn, causes the rock-arm 42 to move a predetermined distance, (according to the numeral-key depressed), thereby moving, or causing to rotate, the selector-plate 44 a predetermined distance. As the plate 44 meshes with the pawl-carrier 46 through the medium of gear-teeth, it will cause the pawl-carrier 46 to make its denominational selection upon the ratchet 49.

The parts thus far enumerated constitute, in general, what I herein designate, respectively, as the "selecting" and "selected" mechanisms of my structure; and, as hereinbefore pointed out, operate only to effect a selection and not to effect a computation, the operation of mechanism for which (independent of the selected- and selecting-mechanisms, and operated independent thereof) will now be described:

Third: The proper selection having been effected, as just described, the operator will now operate the independent operating- and actuating-mechanisms (hereinbefore enumerated), to effect a computation, namely, the handle 61, which, in turn transmits rotary motion to shaft 52 of the independent actuating-mechanism, which, in its turn, (as the cam-plates 53 are secured thereto) transmits rotary motion to said cam-plates 53 (which constitute, as I have herein designated, the independent operating-mechanism of my structure). These cam-plates 53, during their rotary motion, will abut against and force the selected pawl-carrier to return to its normal position, thereby, (as the pawl 48 thereon is engaged with a tooth in the ratchet 49) causing the main-gear 50 to rotate and produce a computation on the number-wheel. If there had been no selection of any one of the pawl-carriers, the cam-plate, in its rotary motion, will perform no operation or movement of that respective pawl-carrier and its connected parts, as they have not been moved out of their normal position.

The statement of operation thus far given, has provided for no carrying of the tens-unit from one numeral-wheel to another of higher denomination. It is, therefore, now in order to describe this:

Fourth: As the main-gears 50 are rotated by the action or rotation of the independent operating-mechanism, they cause certain instrumentalities, such as the cams 70 and levers 72 (and the lever connecting with the latter) to make a selection of one tooth on the ratchet 49. Upon the continued rotation of the cam-plate 53, the carrying-arm 76 is engaged by one of the studs 83 on the cam-plate 53 and causes the carrying-arm 76 slightly to rotate upon its shaft 81, thus causing the pawl 77 (carried by the carrying-arm) to abut against a tooth in ratchet 49 and rotate the main-gear 50 one unital space, thus causing the number-wheel to rotate one unital space to make the final computation and simultaneously restore the carrying-arms 76 to their normal position. Of course, there is a series of carrying-operations during a computation, provided the numbers already registered on the calculator and the ones being added thereto are of sufficient denominational amount to cause these carrying-operations to take place.

Fifth: In the event that the operator has caused to be selected, by the depression of a key, the wrong denominational amount, and desires to correct the same before a computation,—such being possible in my structure by reason of the fact that the selection is first effected without a computation being made, it only becomes necessary to reset the selected-mechanism or parts: This is accomplished by depressing the lever 97 and, then, operating the independent operating- and actuating-mechanisms, as before mentioned.

Sixth: Upon the completion of a mechanical calculation or computation, it becomes a convenience to "clear" the calculator of that computation; that is to say, to restore the number-wheels to a zero-denomination: This is accomplished by actuating the lever 115, in the manner already described, which operation rotates the numeral-wheels to zero-position.

*The accumulator.*—The device is preferably attached to, and forms a part of, the calculator, already described.

Fig. XIX shows the detailed structure and assemblage of the accumulator, which is employed to keep an accumulated sum or sums of daily or other periodical accounts.

Journaled on shaft 120 are a set of gears 121, which are positioned to engage the gears 51 of the previously-designated number-wheels. Above the gears 121, are a second series of number-wheels 122, each provided with a gear 123, to mesh with the corresponding gear 121. The number-wheels 122 are journaled on a shaft 124, which is mounted to move vertically in the elongated slot 125 in the side of the casing. The ends of the shaft 124 are supported by forked arms 126 which are fast on the shaft 127. Also secured to said shaft is the lever arm 128 carrying a stud engaging a cam-slot 129 in the lever 115. Thus the number-wheels 122 are normally in engagement, through gears 121, with the calculator-number-wheels; and, hence, causes the same to accumulate the amounts computed, from time to time, in the calculator. When, however, the lever 115 is operated to move the calculator-number-wheels to zero-position, the number-wheels of the calculator are disengaged therefrom by means of cam-slot 129 and the zero-producer-lever 115, whereby the number-wheels of the accumulator are rendered inactive while the lower set of calculator-number-wheels are being returned to zero-position. When the lever 115 is returned, the accumulator-number-wheels are again thrown into engagement. A spring 130 is employed to retain the number-wheels 122 of the accumulator against accidental displacement until the accumulator-number-wheels are again engaged with the calculator-number-wheels. On the side of each number-wheel 122 is a spring-pawl 131 positioned for engagement with a spline 132 running longitudinally of the shaft 124. When it is desired to reset the number-wheels of the accumulator to zero-position, the lever 115 is first operated to raise the wheels from engagement with gears 121, and then the shaft 124 is turned by a milled wheel 133, or other suitable instrumentality, whereupon the shaft will engage each of the pawls 131, and turn the wheels to the desired position.

In the use of my accumulator, it will be observed that it depends for its operation, not upon the key-operated parts of the typewriter, but, on the contrary, upon the independent operating- and actuating-mechanisms (already described) of the computer. Therefore, it is to be observed that the typewriter-keys (the numeral-keys), while related to the printing-mechanism, are not, at the same time, arranged to actuate either the column-computer, or the accumulator carried thereby. My accumulator is, therefore, to be distinguished from "grand totalizers", so-called, now marketed, because it is not in action at the same time that the key-operated parts are moved; and, it is further to be distinguished from said marketed "grand totalizers", in that it does not take the grand-total of several columns of the single work-sheet, but, on the contrary, accumulates amounts from its related computer and, thus, accumulates computations of the particular column in which the computer is operating. In other words, my accumulator is not adapted to compute a grand-total of several columns of a work-sheet including computations of an intermixed character.

In some cases, it is desirable to employ several calculators on one typewriter, as for instance, in keeping records of both credit and debit-items; and, under such circumstances, I may have two or more calculating-attachments positioned on the shaft 6 and rail 5 as shown in Figs. XXIII and XXIV. There may also be a common actuating hand-lever 61$^a$, and suitable connections so that the moving of the single lever will actuate all the calculators. Each of the several computers carries its own accumulator.

If desirable,—as for instance, where it becomes necessary to typewrite matter directly below a line of figures (as in a column) the calculator may be so disposed upon its support on the line-spacing-carriage that it can be displaced from its position relative to the computer-key-operated parts carried by the letter-spacing-carriage,—either longitudinally on its said support, or laterally thereof, as by being tilted backward. In some instances, I may find it desirable (in lieu of displacing the calculator, itself) temporarily to displace the plunger 11 carried by the letter-spacing-carriage, so that it will be out of engaging-position with the selectors 10 of the computer. To this end, I may pivot or mount said plunger so that it can temporarily be tilted or otherwise shifted out of its normal engaging-position. Or, in lieu of either of these ways, the operator can, with her fingers, push all of the selectors 10 inward as far as they will go, whereby they will be out of position to be engaged by the plunger as it is carried along opposite said selectors. In this instance, when the operator desires to utilize the calculator, she would turn the handle 61, the same as for effecting a computation in the calculator, and then operate the zero-producer, in the manner already described, to return the number-wheels to a zero-registering position.

In the operation of the machine herein disclosed, the operator may avail herself of various ways of locating the computer on its support relative to the column in which a computation is to be written: One way is, after the work-sheet has been adjusted on the platen, to move the letter-space-carriage until the line-and-letter-finder, which it carries, locates the carriage relative to the column. The operator then shifts the calculator on its support to accord with the position of the carriage, which position would, of course, be that which the carriage and computer should occupy to permit the plunger to engage, successively, the arms 10. Another way would be for the operator to "measure-up" the work-sheet on the scale C preferably located at the forward part of the platen, (as shown in Fig. XXIII) and which is graduated to correspond with the graduations on the letter-space scale. This scale C can, of course, be movable longitudinally of the platen, so that it could be shifted backward over the platen to mark off a sheet where its lower edge may be somewhat remote from the normal position of the scale.

It will be noted, by reason of the construction of my improved calculator, that it can be operated, to effect a computation, without the aid of any part of the typewriter other than the plunger; and, even then, the calculator is capable of being operated without the aid of said plunger, since the selectors 10 can be operated by the fingers, if desired. In this particular, as well as in many others, equally important, my device differs from computers attached to typewriters, as now marketed, which are absolutely dependent upon,—in fact are inoperative without,—being operated by parts of the typewriter, itself.

In Figs. XVIII$^a$ and XVIII$^b$, I have shown the casing of the calculator modified to include a housing at the top: Within this housing, and pivoted to a projection 44$^a$ on the selector 44, is an arm 44$^b$ which, at its other end, is pivoted to one member of a bell-crank 44$^c$ which turns on a shaft 44$^d$ that extends laterally in said housing; the other member of said bell-crank carrying an indicator plate 44$^e$ which oscillates in back of the window 44$^f$ in said housing. The actuation of the selector 44, during the making of a selection, as hereinbefore described, actuates the arm 44$^b$ and, in turn, the bell-crank 44$^c$ to position the indicator 44$^e$ to show the numerical selection that has been made by any numeral-key. There are as many of these devices as there are numeral-keys. These parts are returned to normal position when the selector 44 is returned to its normal position in the manner hereinbefore described. This indicator-device shows the amount selected and, in the event that the wrong selection has been made, the fact will be indicated to the operator by this device. Moreover, if there is a numerical selection showing on the indicator, the operator will be apprised of the fact that it is necessary to actuate the independent operating-mechanism, hereinbefore described, to effect a computation, before another selection is made.

In Fig. IX, I have shown my calculator-attachments applied to round-platen typewriters, the bars on which the calculator-attachment is supported, being carried by arms 134 secured to the letter-spacing carriage 135.

In Figs. IX^a, IX^b and IX^c, I have shown a modified form of construction for applying my calculator-attachment to round-platen typewriters. The slide 136 is provided with a series of rack teeth on its lower face, and 137 is a gear supported on the stationary frame and adapted to engage the teeth on slide 136. Operatively connected to the key-lever is a toothed segmental arm 138 arranged to engage and turn the gear 137 when the printing-key is operated. The number of teeth on the arm 138 corresponds to the number on the coöperating finger-key, and according as the arm has one, two, three, or more teeth, the plunger 11 is moved a similar distance to position the parts of the calculating attachment. 139 is a spring for returning the slide to normal position. The remaining parts are the same as in the flat-platen machine already described.

From what has been disclosed herein, as well as from what is obvious, it will be apparent that, not only may certain features of my invention be modified and some be employed independently of others, or in more or less different arrangement, according as the invention may be differently utilized in machines of the character defined, or in different situations; but I desire it to be understood that I may modify the construction in various particulars, since the construction herein disclosed is merely one of many which I have tried with success and have, therefore, elected it as my preferred embodiment; and, further, I desire it to be understood that I may (and I particularly reserve the right to) effect changes, variations, modifications, enlargements, and substitutions with any equivalent and feasible mechanical structures and arrangements, which will produce the desired results practically while not, at the same time, departing from the spirit of my invention.

What I claim as new, and desire to secure by Letters-Patent is:—

1. The combination with a typewriter and the printing-keys thereof, of a calculating-attachment, selecting-means operated by said keys, and rotatable, operating mechanism distinct from and independent of said keys and, when rotated, operating directly into engagement with and on said selecting-means to produce a computation.

2. The combination with a typewriter and the printing-keys thereof, of a calculating-attachment, selecting-means operated by said keys, and rotatable operating mechanism distinct from and independent of said keys and normally out of engagement with said selecting-means, and, when actuated, engaging with and operating directly on said selecting-means to produce computation.

3. The combination with a typewriter and the printing-keys thereof, of a calculating-attachment, selecting-means operated by said printing-keys, and rotatable operating-mechanism distinct from and independent of said typewriter for effecting operation of said selecting-means to produce a computation.

4. The combination with a typewriter and printing-keys thereon, of a calculating-attachment, actuating-instrumentalities carried thereby, means operated by the printing-keys to position the actuating-instrumentalities of the calculating-attachment to effect a selection only, and separate, rotatable means, normally disengaged from said selecting-instrumentalities, and, when operated, engaging with and directly on said instrumentalities to effect operation of said actuating-instrumentalities to produce a computation.

5. The combination with a typewriter and printing-keys thereon, of a calculating-attachment, actuating-instrumentalities carried thereby, means operated by the printing-keys to position the actuating-instrumentalities of the calculating-attachment to effect a selection only, and separate, rotatable means carried by the calculating-attachment, normally disengaged from said selecting-instrumentalities, and, when operated, engaging with and directly on said instrumentalities to effect operation of actuating-instrumentalities to produce a computation.

6. The combination with a typewriter and printing-keys thereon, of a calculating-attachment, actuating-instrumentalities therein, means operated by the printing-keys to position the actuating-instrumentalities of the calculating-attachment to effect a selection only, and separate, rotatable hand-operated means, normally disengaged from said selecting-instrumentalities, and, when operated, engaging with and directly on said instrumentalities to effect operation of said actuating-instrumentalities to produce a computation.

7. The combination with a typewriter and printing-keys thereon, of a calculating-attachment, including actuating-instrumentalities, means operated by the printing-keys to position the actuating-instrumentalities of the calculating-attachment to effect a selection only, and separate, rotatable hnad-operated means carried by the calculating-attachment, normally disengaged from said selecting-instrumentalities, and, when operated, engaging with and directly on said instrumentalities to effect operation of said actuating-instrumentalities to produce a computation.

8. The combination with a typewriter, and printing-keys thereon, of a typewriter-frame, a calculating-attachment detachably secured upon a portion of the frame of said typewriter and including actuating-instrumentalities, means operated by the printing-keys to position the actuating-instrumentalities of the calculating-attachment to effect a selection only, and separate, rotatable means for effecting operation of said actuating-instrumentalities to produce a computation.

9. The combination with a typewriter, and printing-keys thereon, of a typewriter-frame, a calculating-attachment detachably secured upon a portion of said frame and including actuating-instrumentalities, means operated by the printing-keys to position the actuating-instrumentalities of the calculating-attachment to effect a selection only, and separate, rotatable means carried by the calculating-attachment for effecting operation of said actuating-instrumentalities to effect a computation.

10. The combination with a typewriter, and printing-keys thereon, of a calculating-attachment including actuating-instrumentalities, means operated by the printing-keys to position the actuating-instrumentalities of the calculating-attachment to effect a selection only, and separate, rotatable hand-operated means, normally disengaged from said selecting-instrumentalities, and, when operated, engaging with and directly on said instrumentalities to effect operation of said key-operated instrumentalities, to effect a computation.

11. The combination with a typewriter, and printing-keys thereon, of a calculating-attachment including actuating-instrumentalities, means operated by the printing-keys to position the actuating-instrumentalities to effect merely a selection, and separate hand-operated means carried by the calculating-attachment for effecting operation of said key-operated instrumentalities to effect a computation.

12. The combination with a typewriter and printing-keys thereon, of a bar comprising part of the typewriter-frame, a calculating-attachment upon said bar and including actuating-instrumentalities, means operated by the printing-keys to position the actuating-instrumentalities of said calculating-attachment to effect a selection only, and separate means for operating said actuating-instrumentalities to effect a computation.

13. The combination with a typewriter and printing-keys thereon, of a typewriter-frame, a bar comprising part of the typewriter-frame, a calculating-attachment upon said bar and including actuating-instrumentalities, means operated by the printing-keys to position the actuating-instrumentalities of said calculating-attachment to effect a selection only, and separate means carried by the calculating-attachment for operating said actuating-instrumentalities to effect a computation.

14. The combination with a typewriter and printing-keys thereon, of a typewriter-frame, a bar comprising part of the typewriter-frame, a calculating-attachment upon said bar and including actuating-instrumentalities, means operated by the printing-keys to position the actuating-instrumentalities of said calculating-attachment to effect a selection only, and separate hand-operated means for operating said actuating instrumentalities to effect a computation.

15. The combination with a typewriter and printing-keys thereon, of a typewriter-frame, a bar comprising part of the typewriter-frame, a calculating-attachment upon said bar and including actuating-instrumentalities, means operated by the printing-keys to position the actuating-instrumentalities of said calculating-attachment to effect a selection only, and separate hand-operated means for operating said actuating-instrumentalities to effect a computation.

16. The combination with a typewriter and printing-keys thereon, of a typewriter-frame, a rack-bar comprising part of the typewriter-frame, a calculating-attachment including actuating-instrumentalities and carrying a latch arranged to engage the teeth of said rack-bar, means operated by the printing-keys to position the actuating-instrumentalities of the calculating-attachment to effect a selection only, and separate means for operating said actuating-instrumentalities to effect a computation.

17. The combination with a typewriter and printing-keys thereon, of a typewriter-frame, a rack-bar comprising part of the typewriter-frame, a calculating-attachment including actuating-instrumentalities and carrying a latch arranged to engage the teeth of said rack-bar, means operated by the printing-keys to position the actuating-instrumentalities of the calculating-attachment to effect a selection, and separate means carried by the calculating-attachment for operating said actuating-instrumentalities to effect a computation.

18. The combination with a typewriter and printing-keys thereon, of a typewriter-frame, a rack-bar comprising part of the typewriter-frame, a calculating-attachment including actuating-instrumentalities and carrying a latch arranged to engage the teeth of said rack-bar, means operated by the printing-keys to position the actuating-instrumentalities of the calculating-attachment to effect a selection only, and separate hand-operated means for operating said actuating-instrumentalities to effect a computation.

19. The combination with a typewriter and printing-keys thereon, of a typewriter-frame, a rack-bar comprising part of the typewriter-frame, a calculating-attachment including actuating-instrumentalities and carrying a latch arranged to engage the teeth of said rack-bar, means operated by the printing-keys to position the actuating-instrumentalities of the calculating-attachment to effect a computation.

20. The combination with a typewriter, of a typewriter-frame, a bar comprising a part of said frame, a calculating-attachment positioned on the bar, a casing surrounding the calculating-attachment, and a latch pivoted to the casing and coöperating with said bar to hold the calculating-attachment in adjusted position.

21. The combination with a typewriter, of a typewriter-frame, a bar comprising a portion of the frame, a calculating-attachment positioned upon said bar, a casing surrounding the calculating-attachment, a latch arranged on said casing, and means carried by the bar for locking the latch against movement longitudinally thereof when in lowered position.

22. The combination with a typewriter, of printing-keys thereon, a typewriter-frame, calculating-mechanism adjustably positioned on the typewriter-frame and including actuating-instrumentalities, means operated by the printing-keys for positioning the actuating-instrumentalities of the calculating-mechanism to effect a selection only, and separate means for operating said actuating-instrumentalities to effect a computation.

23. The combination with a typewriter, of printing-keys thereon, a typewriter-frame, calculating-mechanism adjustably positioned on the typewriter-frame and including actuating-instrumentalities, means operated by the printing-keys for positioning the actuating-instrumentalities of the calculating-mechanism to effect a selection only, and separate means carried by the calculating-mechanism for operating said actuating-instrumentalities to effect a computation.

24. The combination with a typewriter, of printing-keys thereon, a typewriter-frame, calculating-mechanism adjustably positioned on the typewriter-frame and including actuating-instrumentalities, means operated by the printing-keys for positioning the actuating-instrumentalities of the calculating-mechanism to effect a selection only, and separate hand-operated means for operating said actuating-instrumentalities to effect a computation.

25. The combination with a typewriter and a frame, of printing-keys thereon, calculating-mechanism adjustably positioned on the typewriter-frame and including actuating-instrumentalities, means operated by the printing-keys for positioning the actuating-instrumentalities of the calculating-mechanism, to effect a selection only, and separate hand-operated means carried by the actuating-mechanism for operating said actuating-instrumentalities to effect a computation.

26. The combination with a typewriter and a frame, of a calculating-attachment adjustably secured to the frame thereof and including actuating-instrumentalities, means carried by the typewriter for positioning the actuating-instrumentalities of the calculating-attachment to effect a selection only, and means independent of the typewriter for operating said actuating-instrumentalities to effect a computation.

27. The combination with a typewriter and a frame, of a calculating-attachment adjustably secured to the frame thereof and including actuating-instrumentalities, means carried by the typewriter for positioning the actuating-instrumentalities of the calculating-attachment to effect a selection only, and means independent of the typewriter and carried by the calculating-attachment for operating said actuating-instrumentalities to effect a computation.

28. The combination with a typewriter and a frame, of a calculating-attachment adjustably secured to the frame thereof and including actuating-instrumentalities, means carried by the typewriter for positioning the actuating-instrumentalities of the calculating-attachment to effect a selection only, and hand-operated means independent of the typewriter for operating said actuating-instrumentalities to effect a computation.

29. The combination with a typewriter and a frame, of a calculating-attachment adjustably secured to the frame thereof and including actuating-instrumentalities, means carried by the typewriter for positioning the actuating-instrumentalities of the calculating-attachment to effect a selection only, and hand-operated means independent of the typewriter and carried by said calculating-attachment for operating said actuating-instrumentalities to effect a computation.

30. In a flat-platen typewriter, the combination with a line-spacing carriage, of a letter-spacing carriage, calculating mechanism carried by said line-spacing carriage and including actuating-instrumentalities, means operated by the printing-keys for positioning the actuating-instrumentalities of the calculating-mechanism to effect a selection only, and separate means for operating said actuating-instrumentalities to effect a computation.

31. In a flat-platen typewriter, the combination with a line-spacing carriage, of a letter-spacing carriage, calculating-mechanism carried by said line-spacing carriage and including actuating-instrumentalities, means operated by the printing-keys for positioning the actuating-instrumentalities of the calculating mechanism to effect a selection only, and separate means carried by said calculating-mechanism for operating said actuating-instrumentalities to effect a computation.

32. In a flat-platen typewriter, the combination with a line-spacing carriage, of a letter-spacing carriage, calculating-mechanism carried by said line-spacing carriage including actuating-instrumentalities, means operated by the printing-keys for positioning the actuating-instrumentalities of the calculating-mechanism to effect a selection only, and separate hand-operated means for operating said actuating-instrumentalities to effect a computation.

33. In a flat-platen typewriter, the combination with a line-spacing carriage, of a letter-spacing carriage, calculating-mechanism carried by said line-spacing carriage and including actuating-instrumentalities, means operated by the printing-keys for positioning the actuating-instrumentalities of the calculating-mechanism to effect a selection only, and separate hand-operated means carried by said calculating-mechanism for operating said actuating-instrumentalities to effect a computation.

34. In a flat-platen typewriter, the combination with a line-spacing carriage, of a letter-spacing carriage, calculating-mechanism supported on said line-spacing carriage and including actuating-instrumentalities, means carried by the letter-spacing carriage for positioning the actuating-instrumentalities of the calculating-mechanism to effect a selection only, and separate means for operating said actuating-instrumentalities to effect a computation.

35. In a flat-platen typewriter, the combination with a line-spacing carriage, of a letter-spacing carriage, calculating-mechanism supported on said line-spacing carriage and including actuating-instrumentalities, means carried by the letter-spacing carriage for positioning the actuating-instrumentalities of the calculating-mechanism to effect a selection only, and separate means carried by said calculating-mechanism for operating said actuating-instrumentalities to effect a computation.

36. In a flat-platen typewriter, the combination with a line-spacing carriage, of a letter-spacing carriage, calculating-mechanism supported on said line-spacing carriage and including actuating-instrumentalities, means carried by the letter-spacing carriage for positioning the actuating-instrumentalities of the calculating-mechanism to effect a selection only, and separate hand-operated means for operating said actuating-instrumentalities to effect a computation.

37. In a flat-platen typewriter, the combination with a line-spacing carriage, of a letter-spacing carriage, calculating-mechanism supported in said line-spacing carriage and including actuating-instrumentalities, means carried by the letter-spacing carriage for positioning the actuating-instrumentalities of the calculating-mechanism to effect a selection only, and separate hand-operated means carried by said calculating-mechanism for operating said actuating-instrumentalities to effect a computation.

38. In a flat-platen typewriter, the combination with a line-spacing carriage, of a letter-spacing carriage, calculating-mechanism adjustably supported on said line-spacing carriage and including actuating-instrumentalities, means carried by the letter-spacing carriage for positioning the actuating-instrumentalities of the calculating-mechanism to effect a selection only, and separate means for operating said actuating-instrumentalities to effect a computation.

39. In a flat-platen typewriter, the combination with a line-spacing carriage, of a letter-spacing carriage, calculating-mechanism adjustably supported on said line-spacing carriage and including actuating-instrumentalities, means carried by the letter-spacing carriage for positioning the actuating-instrumentalities of the calculating-mechanism to effect a selection only, and separate means carried by said calculating-mechanism for operating said actuating-instrumentalities to effect a computation.

40. In a flat-platen typewriter, the combination with a line-spacing carriage, of a letter-spacing carriage, calculating-mechanism adjustably supported on said line-spacing carriage and including actuating-instrumentalities, means carried by the letter-spacing carriage for positioning the actuating-instrumentalities of the calculating-mechanism to effect a selection only, and separate hand-operated means for operating said actuating-instrumentalities to effect a computation.

41. In a flat-platen typewriter, the combination with a line-spacing carriage, of a letter-spacing carriage, calculating-mechanism adjustably supported on said line-spacing carriage and including actuating-instrumentalities, means carried by the letter-spacing carriage for positioning the actuating-instrumentalities of the calculating-mechanism to effect a selection only, and separate hand-operated means carried by said calculating-mechanism for operating said actuating-instrumentalities to effect a computation.

42. In a flat-platen typewriter, the combination with a line-spacing carriage, of a letter-spacing carriage, calculating-mechanism adjustably supported on said line-spacing carriage and including actuating-instrumentalities, means operated by the printing-keys for positioning the actuating-instrumentalities of the calculating-mechanism to effect a selection only, and separate means for operating said actuating-instrumentalities to effect a computation.

43. In a flat-platen typewriter, the combination with a line-spacing carriage, of a letter-spacing carriage, printing-keys, calculating-mechanism adjustably supported on said line-spacing carriage and including actuating-instrumentalities, means operated by the printing-keys for positioning the actuating-instrumentalities of the calculating-mechanism to effect a selection only, and separate means carried by said calculating-mechanism for operating said actuating-instrumentalities to effect a computation.

44. In a flat-platen typewriter, the combination with a line-spacing carriage, of a letter-spacing carriage, printing-keys, calculating-mechanism adjustably supported on said line-spacing carriage and including actuating-instrumentalities, means operated by the printing-keys for positioning the actuating-instrumentalities of the calculating-mechanism to effect a selection only, and separate hand-operated means for operating said actuating-instrumentalities to effect a computation.

45. In a flat-platen typewriter, the combination with a line-spacing carriage, of a letter-spacing carriage, printing-keys, calculating-mechanism adjustably supported on said line-spacing carriage and including actuating-instrumentalities, means operated by the printing-keys for positioning the actuating-instrumentalities of the calculating-mechanism to effect a selection only, and separate hand-operated means carried by said calculating-mechanism for operating said actuating-instrumentalities to effect a computation.

46. In a typewriting machine, the combination with a frame, of a letter-spacing carriage, adding-mechanism carried by the frame and including actuating-instrumentalities, means carried by the carriage for positioning the actuating-instrumentalities of the adding-mechanism to effect a selection only, means independent of the carriage for operating said actuating-instrumentalities, and an accumulator operatively associated with said adding mechanism and operated independently of the typewriter.

47. In a typewriting machine, the combination with a frame, of a letter-spacing carriage, adding-mechanism carried by the frame and including actuating-instrumentalities, means carried by the letter-spacing carriage for positioning the actuating-instrumentalities of the adding-mechanism, means carried by said adding-mechanism for operating said actuating-instrumentalities, and an accumulator coöperatively associated with said adding-mechanism and operated independently of the typewriter.

48. In a typewriting machine, the combination with a frame, of a letter-spacing carriage, adding-mechanism carried by the frame and including actuating-instrumentalities, means carried by the letter-spacing carriage for positioning the actuating-instrumentalities of the adding-mechanism, hand-operated means carried by said adding-mechanism for operating said actuating-instrumentalities to effect a computation and an accumulating-device operatively associated with said adding-mechanism and operated independent of the typewriter.

49. In a flat-platen typewriter, the combination with a line-spacing carriage, of a letter-spacing carriage, adding-mechanism carried by said line-spacing carriage and including actuating-instrumentalities, means carried by the letter-spacing carriage for positioning the actuating-instrumentalities of the adding-mechanism to effect a selection only, means independent of the letter-spacing for operating said actuating-instrumentalities to effect a computation, and an accumulating-device operatively associated with said adding-mechanism and operated independently of the typewriter.

50. In a flat-platen typewriter, the combination with a line-spacing carriage, of a letter-spacing carriage, adding-mechanism carried by the line-spacing carriage and including actuating-instrumentalities, means carried by the letter-spacing carriage for positioning the actuating-instrumentalities to the adding-mechanism to effect a selection only, means carried by the adding-mechanism for operating said actuating-instrumentalities to effect a computation, and an accumulating-device operatively associated with said adding-mechanism.

51. In a flat-platen typewriter, the combination with a line-spacing carriage, of a letter-spacing carriage, adding-mechanism carried by the line-spacing carriage and including actuating-instrumentalities, means carried by the letter-spacing carriage for positioning the actuating-instrumentalities of the adding-mechanism to effect a selection only, hand-operated means carried by the adding-mechanism for operating said actuating-instrumentalities, to effect a computation, and an accumulating-device operatively associated with said adding-mechanism.

52. In a flat-platen typewriter, the combination with a line-spacing carriage, of a letter-spacing carriage, printing-keys, adding-mechanism carried by the line-spacing carriage and including actuating-instrumentalities, means operated by the printing-keys for positioning the actuating-instrumentalities to effect a selection only, independent means for operating said actuating-instrumentalities to effect a computation, and an accumulating-device operatively associated with said adding-mechanism.

53. In a flat-platen typewriter, the combination with a line-spacing carriage, of a letter-spacing carriage, printing-keys, adding-mechanism carried by the line-spacing carriage and including actuating-instrumentalities, means operated by the printing-keys for positioning the actuating-instrumentalities of the adding-mechanism to effect a selection only, means carried by the adding-mechanism for operating said actuating-instrumentalities to effect a computation, and an accumulating-device operatively associated with said adding-mechanism.

54. In a flat-platen typewriter, the combination with a line-spacing carriage, of a letter-spacing carriage, printing-keys, adding-mechanism carried by the line-spacing carriage and including actuating-instrumentalities, means operated by the printing-keys for positioning the actuating-instrumentalities of the adding-mechanism to effect a selection only, hand-operated means carried by the adding-mechanism for operating said actuating instrumentalities to effect a computation, and an accumulating-device operatively associated with said adding-mechanism.

55. In a typewriter, the combination with a frame, of a letter-spacing carriage, a scale for indicating the relative position of the carriage to the frame, calculating-mechanism adjustably supported on the frame, and an indicator carried by the calculating-mechanism and arranged to aline with the first-mentioned scale.

56. In a flat-platen typewriter, the combination with a line-spacing carriage, of a letter-spacing carriage, a scale mounted on said line-spacing carriage and coöperating with means on the letter-spacing carriage to indicate their relative positions, adding-mechanism adjustably mounted on the line-spacing carriage, and an indicator carried by said adding-mechanism and arranged to aline with the before-mentioned scale.

57. In a typewriter, the combination with a frame, of a letter-spacing carriage, a calculating-attachment mounted on the frame, and plunger-operating means therefor traveling upon said letter-spacing carriage.

58. In a flat-platen typewriter, the combination with a line-spacing carriage, of a letter-spacing carriage, a calculating-attachment mounted on the line-spacing carriage, and plunger-operating-means therefor slidable upon said letter-spacing carriage.

59. In a typewriter, the combination with a frame, of a letter-spacing carriage, a calculating-attachment mounted on the frame, and a plunger slidable upon the letter-spacing carriage and constituting a part of the selecting-means for the calculating-attachment.

60. In a typewriter, the combination with a frame, of a letter-spacing carriage, a calculating-attachment mounted on the frame, and plunger-operating-means therefor slidable horizontally upon the letter-spacing carriage.

61. In a typewriter, the combination with a frame, of a letter-spacing carriage, a calculating-attachment mounted on the frame, selecting-levers for said calculating-attachment, and means slidable upon the letter-spacing carriage to engage said levers successively as the carriage moves for letter-spacing.

62. In a typewriter, the combination with a frame, of a letter-spacing carriage, a calculating-attachment mounted on the frame, and yieldable calculator-engaging-means supported by said letter-spacing carriage.

63. In a typewriter, the combination with a frame, of a letter-spacing carriage, a calculating-attachment mounted on the frame, and yieldable plunger-means supported by said letter-spacing carriage and slidable thereon.

64. In a typewriter, the combination with a frame, of a letter-spacing carriage, calculating-mechanism mounted on the frame, levers for said calculating-mechanism, and a slidable plunger mounted upon the letter-spacing carriage for successive engagement with said levers.

65. In a typewriter, the combination with a frame, of a letter-spacing carriage, calculating-mechanism mounted on the frame, levers for said calculating-mechanism, and a slidable plunger mounted upon the letter-spacing carriage for successive engagement with said levers, and means permitting said plunger to yield laterally.

66. In a typewriter, the combination with a frame, of a letter-spacing carriage, calculating-mechanism mounted on the frame, levers for said calculating-mechanism, a plunger upon the letter-spacing carriage slidable to engage said levers, and means for preventing excessive movement of said plunger.

67. In a typewriter, the combination with a frame, of a letter-spacing carriage, a calculating-attachment mounted on the frame, plunger-means therefor slidable upon the letter-spacing carriage, and means for preventing excessive movement of said plunger-means.

68. In a typewriter, the combination with a frame, of a letter-spacing carriage, calculating-mechanism mounted on said frame, levers for said calculating-mechanism, slidable-means on the letter-spacing carriage for engaging said levers, and instrumentalities for preventing excessive movement of said levers.

69. In a typewriter, the combination with a frame, of a letter-spacing carriage, calculating-mechanism mounted on the frame, levers for said calculating-mechanism, slidable-means on the letter-spacing carriage for engaging said levers, and instrumentalities for preventing excessive movement of the slidable-means, and the levers.

70. In a typewriter, the combination with a frame, of a letter-spacing carriage, calculating-mechanism mounted on said frame, slidable-means supported on the letter-spacing carriage, a plunger-operating shaft connected to said means, and instrumentalities for imparting variable movement to said shaft.

71. In a typewriter, the combination with a frame, of calculating-mechanism mounted thereon, a letter-spacing carriage and numeral printing-keys thereon, slidable-means supported on said letter-spacing carriage, and instrumentalities connecting said keys and said slidable-means whereby to give the same a variable movement corresponding to the number of units represented by each numeral printing-key.

72. In a typewriter, the combination with a frame, of calculating-mechanism mounted thereon, a letter-spacing carriage and numeral printing-keys thereon, slidable-means supported on said letter-spacing carriage, a shaft connecting with said means, loose and fixed arms on said shaft, means for depressing said loose arms, and means for locking a depressed loose arm to its corresponding fixed arm whereby to limit the downward movement of said fixed arm.

73. In a typewriter, the combination with a frame, of calculating-mechanism mounted thereon, a letter-spacing carriage and numeral printing-keys therefor, slidable-means slidable on said letter-spacing carriage, a shaft connected to said means, loose and fixed arms on said shaft, turn-buckles connected to the loose arms, slots in said turn-buckles, a stop for limiting the downward movement of said turn-buckles, and projections on the levers of said numeral-printing-keys engaging with said slots.

74. In a typewriter, the combination with a frame, of calculating-mechanism mounted thereon, a letter-spacing carriage, and numeral printing-keys therefor, reciprocating-means slidable on said carriage, a shaft connected to said means, loose and fixed arms on said shaft, a spring-operated catch carried by each loose arm and engaging under the corresponding fixed arm when lowered, and means for disengaging said catch when the arms are raised.

75. In a typewriter, the combination with a frame, of calculating-mechanism mounted thereon, a letter-spacing carriage, reciprocating-means carried thereby, a shaft connected to said means, loose and fixed arms on said shaft, means for depressing said loose arms, and means for locking each depressed loose arm to its corresponding fixed arm whereby to limit the downward movement of said fixed arm.

76. In a typewriter, the combination with a frame, of a letter-spacing carriage, calculating-mechanism mounted on said frame, reciprocating-means therefor supported on said carriage, a pin carried by said means, a toothed bar positioned above said pin, and means for lowering said toothed bar into engagement with said pin to limit the movement of the reciprocating means.

77. In a typewriter, the combination with a frame, of a letter-spacing carriage, calculating-mechanism mounted on said frame, reciprocating-means therefor slidable on the carriage, a pin carried by said means, a toothed bar positioned above the pin, a drive-link, connections between said toothed bar and the drive-link whereby said bar is lowered at a predetermined point to engage the pin and prevent excessive movement of said means.

78. In a typewriter, the combination with a frame, of a letter-spacing carriage, calculating-mechanism mounted on said frame, a plurality of levers for said calculating-mechanism, reciprocating-means on the carriage for actuating said levers, and means carried by the carriage for limiting the movement of said levers.

79. In a typewriter, the combination with a frame, of a letter-spacing carriage, an oscillating-member carried thereby, calculating-mechanism mounted on the frame, a plurality of levers for said calculating-mechanism, reciprocating-means on the carriage for actuating said levers, and means connected to the oscillating-member for engaging said levers and preventing excessive movement thereof.

80. In a typewriter, the combination with a frame, of a calculating-attachment therefor, a letter-spacing carriage, and a reciprocating-means carried by the carriage and including a slide and a laterally-yieldable bar pivoted thereto.

81. In a typewriter, the combination with a frame, of a calculating-attachment thereon, a letter-spacing carriage, numeral printing-keys, and a reciprocating-means carried by the carriage and including a slidable plunger, a lever connected thereto, an arm connecting said lever with a second lever, in turn connected to a shaft, loose and fixed arms mounted on the shaft, and operative connections between said loose arms and the numeral printing-keys.

82. In a typewriter, the combination with a frame, of a calculating-attachment thereon, a letter-spacing carriage, printing-keys, and a means carried by the carriage and including a slidable plunger, a lever connected thereto, an arm connecting said lever with a second lever, in turn connected to a shaft, loose and fixed arms mounted on the shaft, and operative connections between said loose arms and the numeral printing-keys, such connections comprising turn-buckles connected to the loose arms, slots in said turn-buckles, and projections carried by the key levers to engage said slots.

83. In a typewriter, the combination with a frame, of a calculating-attachment thereon, a letter-spacing carriage, slidable-means on the carriage, and instrumentalities for imparting differential movement to said slidable-means and including a shaft, loose and fixed arms thereon, turn-buckles connected to the loose arms, slots of different lengths in said turn-buckles, said slots corresponding in lengths and the number to the units represented by the particular numeral printing-key with which the turn-buckle is operatively associated, and instrumentalities for locking a fixed arm to its corresponding loose arm during downward movement.

84. In a typewriter, the combination with a frame, of a calculating-attachment thereon, a plurality of levers included by said calculating-attachment, a letter-spacing carriage, reciprocating-means carried by the carriage for moving said levers successively, and means operated by the printing-keys for limiting the movement of the reciprocating-means and of the aforementioned levers.

85. In a typewriter, the combination with a frame, of a calculating-attachment thereon, a letter-spacing carriage, means slidable on the carriage, means controlled by the printing-keys for moving said means variable distances, and means for preventing excessive movement thereof.

86. In a typewriter, the combination with a frame, of calculating-mechanism thereon, a letter-spacing carriage, means mounted on the letter-spacing carriage and adapted to engage levers associated with the calculating-mechanism, and means for permitting movement of the carriage while the engaging means is in operative engagement with the levers of the calculating-mechanism.

87. In a typewriter, the combination with a frame, of a calculating-mechanism thereon, a letter-spacing carriage, means mounted on the letter-spacing carriage and including a slidable plunger, a plunger-operating shaft connected thereto, loose and fixed arms upon the shaft, turn-buckles connected to said loose arms, projections carried by the turn-buckles, and a stationary abutment for engagement with said projections, whereby the downward movement of said turn-buckles is limited.

88. In a typewriter, the combination with a frame, of calculating-mechanism thereon, a letter-spacing carriage, means mounted on the letter-spacing carriage and including a slidable plunger, a shaft connected thereto, loose and fixed arms upon the shaft, turn-buckles connected to said loose arms, projections carried by said turn-buckles, a stationary abutment for engagement with said projection whereby to limit the downward movement of said turn-buckles, and means for automatically locking each fixed arm to its corresponding loose arm during downward movement.

89. In a typewriter, the combination with a frame, of a calculating-attachment thereon, a letter-spacing carriage, printing-keys, means mounted on the carriage, a shaft connected to said means, loose and fixed arms carried by said shaft, adjustable connections adjacent the loose arms, slots of different lengths in said connections and corresponding in length to the number of units represented by the respective numeral printing-key with which it is operatively associated, and a projection carried by each numeral printing-key-lever and engaging in the slot of the respective lever.

90. In a typewriter, the combination with a frame, of calculating-mechanism mounted thereon, a letter-spacing carriage, reciprocating-means upon the carriage, and operating-instrumentalities therefor including a shaft, a loose and fixed arm thereon, a projection on said loose arm and adapted to engage the fixed arm when depressed, a spring-operated catch pivoted on the loose arm and engaging under said fixed arm when depressed, and means for moving said catch out of engaging position when the loose arm is in raised or normal position.

91. In a typewriter, the combination with a frame, of a calculating-attachment mounted thereon, a letter-spacing carriage, means upon the carriage including a slidable plunger, a pin carried by said plunger, a toothed bar positioned above said pin, means for moving the plunger a distance corresponding to the number of units in the digit being printed, and means for evening said toothed bar to engage the pin at the proper point and prevent movement of the plunger beyond such distance.

92. In a typewriter, the combination with a frame, of a calculating-attachment mounted thereon, a letter-spacing carriage, an oscillating-member carried thereby, means upon the carriage including a slidable plunger, a pin carried by said plunger, a toothed bar positioned above said pin, means for moving the plunger a distance corresponding to the number of units in the digit being printed, and means operated by the oscillating-member for lowering said toothed bar to engage the pin at the proper point and prevent movement of the plunger beyond such distance.

93. In a typewriter, the combination with a frame, of a calculating-attachment mounted upon the same, a plurality of levers for said calculating-attachment, a letter-spacing carriage, a reciprocating-means upon the carriage for moving the before-mentioned levers, and instrumentalities for preventing excessive movement of said levers.

94. In a typewriter, the combination with a frame, of a calculating-attachment mounted thereon, levers for said calculating-attachment, a letter-spacing carriage a drive-link carried thereby, reciprocating - means upon the carriage for moving said levers, and instrumentalities controlled by said drive-link for preventing excessive movement of said levers.

95. In a typewriter, the combination with a frame, of a calculating-attachment mounted thereon, levers for said calculating-attachment having shoulders at their extremities, a letter-spacing carriage, means for moving said levers including a movable slide, a plunger carried by said slide, a latch pivoted to the slide, and means for moving said latch to engage behind one of the shoulders of the before - referred to levers.

96. In a typewriter, the combination with a frame, of a calculating-attachment mounted thereon, levers for said calculating-attachment having shoulders at their extremities, a letter-spacing carriage, means for moving said levers including a movable slide, a plunger pivoted vertically thereto, a latch pivoted horizontally to said slide, and means for moving said latch to engage behind one of the shoulders of the aforesaid levers.

97. In a typewriter, the combination with a frame, of a calculating-attachment mounted thereon, levers for said calculating-attachment having shoulders at their extremities, a letter-spacing carriage, an oscillating-member carried thereby, means for moving said levers including a movable slide, a plunger pivoted vertically thereto, a latch pivoted horizontally to said slide, and means controlled by said oscillating-member for moving said latch to engage behind one of the shoulders of the aforesaid levers.

98. In a typewriter, the combination with a frame, of a calculating-attachment mounted thereon, levers for said calculating-attachment having shoulders at their extremities, a letter-spacing carriage, means for moving said levers including a movable slide, a plunger pivoted thereto, a stop for the plunger and a spring holding the same normally against such stop, a latch also pivoted to the slide, and means for moving said latch to engage behind one of the shoulders of the aforesaid levers.

99. In a typewriter, the combination with a frame, of a calculating-attachment mounted thereon, levers for said calculating-attachment having shoulders at their extremities, a letter-spacing carriage, an oscillating-link carried thereby, means for moving said levers including a movable slide, a plunger pivoted thereto, a stop for the plunger and a spring holding the same normally against such stop, a latch also pivoted to the slide, and means controlled by the link for moving said latch to engage behind one of the shoulders of the aforesaid levers.

100. In a typewriter, the combination with a frame, of a calculating-attachment mounted thereon, levers for said calculating-attachment having shoulders at their extremities, a letter - spacing carriage, means for moving said levers including a slide, a plunger carried thereby, a latch pivoted to the slide, a pin on the slide, a toothed bar positioned above the pin, means for moving the slide a distance corresponding to the number of units in the digit being printed, and means for lowering said toothed bar to engage said pin and for moving the latch to engage behind a shoulder of one of the aforementioned levers.

101. In a typewriter, the combination with a frame, of a calculating - attachment mounted thereon, levers for said calculating-attachment having shoulders at their extremities, a letter - spacing carriage, a drive-link carried thereby, means for moving said levers including a slide, a plunger carried thereby, a latch pivoted to the slide, a pin on the slide, a toothed bar positioned above the pin, means for moving the slide a distance corresponding to the number of units in the digit being printed, and means controlled by the drive-link for lowering said toothed bar to engage said pin and for moving the latch to engage behind a shoulder of one of the aforesaid levers.

102. The combination with a typewriter, of an adding-attachment including denominational wheels, gears for turning the same, instrumentalities for operating said gears, devices under the control of the typewriter for positioning said gear operating instrumentalities, to effect a selection only, and separate means for actuating the same to effect a computation.

103. The combination with a typewriter and printing - keys therefor, of an adding - attachment including denominational wheels, gears for turning the same, instrumentalities for operating said gears, levers under the control of the printing-keys of the typewriter for positioning said gear-operating instrumentalities to effect a selection only, and separate means independent of the typewriter for actuating the same to effect a computation.

104. The combination with a typewriter and printing-keys therefor, of an adding-attachment controlled by said printing-keys and including a denominational wheel, a gear for turning the same, a ratchet-wheel carried by said gear, a pawl operatively positioned relative to the ratchet-wheel, means for moving the pawl backward relative to the ratchet, and independent means for moving the pawl forward to turn the gear.

105. The combination with a typewriter and printing-keys therefor, of an adding-attachment controlled by said printing-keys and including a denominational-wheel, a gear for turning the same, a ratchet-wheel carried by said gear, a pawl-carrier operatively positioned relative to the gear, means for positioning said pawl-carrier, and separate means for moving said pawl-carrier forward to turn the gear.

106. The combination with a typewriter and printing-keys therefor, of an adding-attachment controlled by said printing-keys and including a denominational-wheel, a gear for turning the same, ratchet-teeth on said gear, a pawl-carrier positioned adjacent the ratchet-teeth, means for turning said pawl-carrier in one direction, and separate means for turning said pawl-carrier in the opposite direction.

107. The combination with a typewriter and printing-keys therefor, of an adding-attachment controlled by said printing-keys and including a denominational-wheel, a gear for turning the same, ratchet-teeth on said gear, a pawl-carrier positioned adjacent said ratchet-teeth and provided with a segmental-rack, a selective-plate meshing with said rack to move the pawl-carrier in its opposite direction, to make a selection.

108. The combination with a typewriter and printing-keys therefor, of an adding-attachment controlled by said printing-keys and including a denominational-wheel, a gear for turning the same, ratchet-teeth on said gear, a pawl-carrier positioned adjacent said ratchet-teeth and provided with a segmental rack, a selective-plate in engagement with the rack, a lever connected with said selective-plate whereby to turn the pawl-carrier in one direction, and separate means for turning said pawl-carrier in the opposite direction.

109. The combination with a typewriter, of an adding-attachment including a number-wheel, a gear engaging said number wheel for turning the same, ratchet-teeth on said gear, a pawl-carrier positioned adjacent the ratchet-teeth, means for turning the pawl-carrier in one direction, and a revoluble cam for moving it in the opposite direction.

110. The combination with a typewriter and printing-keys therefor, of an adding-attachment including a denominational-wheel, a gear for turning the same, ratchet-teeth on said gear, a pawl-carrier positioned adjacent the ratchet-teeth, means controlled by the printing-keys of the typewriter for moving the pawl-carrier, and a revoluble cam for moving it in the opposite direction.

111. The combination with a typewriter and printing-keys therefor, of an adding-attachment controlled by said printing-keys and including a number-wheel, a gear engaging said number wheel for turning the same, ratchet-teeth on said gear, a pawl-carrier positioned adjacent the ratchet-teeth, means for turning said pawl-carrier in one direction, and a manually-controlled cam for moving it in the reverse direction.

112. The combination with a typewriter and printing-keys therefor, of an adding-attachment controlled by said printing-keys and including a plurality of number-wheels and gears engaging said number wheels for turning the same, pawl-carriers positioned adjacent said gears, means for turning the pawl-carriers in one direction, and a series of cams for turning said pawl-carriers in the opposite direction, the engaging-portions of said cams being arranged spirally to cause them to move the pawl-carriers successively.

113. The combination with a typewriter and printing-keys therefor, of an adding-attachment controlled by the printing-keys and including a number-wheel and gear engaging said number-wheel for turning the same, ratchet-teeth on said gear, a pawl-carrier positioned adjacent the ratchet-teeth, and means for holding the pawl out of engagement with said ratchet-teeth.

114. The combination with a typewriter and printing-keys therefor, of an adding-attachment controlled by said printing-keys and including a number-wheel and gear engaging said number-wheel for turning the same, ratchet-teeth on said gear, a pawl-carrier positioned adjacent the ratchet-teeth, means for holding the pawl out of engagement with said ratchet-teeth, and means for turning the pawl-carrier while the pawl is held out of engagement.

115. The combination with a typewriter and printing-keys therefor, of an adding-attachment controlled by said printing keys and including a denominational-wheel and gear for turning the same, ratchet-teeth on said gear, a pawl-carrier positioned adjacent the ratchet-teeth, a pawl engaging said teeth, a stud carried by the pawl and projecting through an opening in said pawl-carrier, a lever-arm abutting said stud, and means for turning the lever-arm to move the pawl out of engagement.

116. The combination with a typewriter and printing-keys therefor, of an adding-attachment controlled by said printing keys and including a denominational-wheel and gear for turning the same, ratchet-teeth on said gear, a pawl-carrier positioned adjacent the ratchet-teeth, a pawl engaging said teeth, a stud carried by the pawl and projecting through an opening in said pawl-carrier, a lever-arm abutting said stud, means for turning the lever-arm to move the pawl out of engagement, and means for turning the pawl-carrier while the pawl is disengaged.

117. The combination with a typewriter and printing-keys therefor, of an adding-attachment including a series of number-wheels and gears engaging said number-wheels for turning the same, and successively-operated means for turning each gear one increment after the next adjacent gear on the right has moved its denominational-wheel to zero or farther.

118. The combination with a typewriter and printing-keys therefor, of an adding-attachment including a series of number-wheels and gears engaging said number-wheels for turning the same, a plurality of spaced cams carried by each gear, and instrumentalities controlled by said cams and positioned to move each gear one increment after the next adjacent gear on the right has moved its denominational-wheel to zero or farther.

119. The combination with a typewriter and printing-keys therefor, of an adding-attachment controlled by said printing keys and including two adjacent denominational-wheels and gears for turning the same, ratchet-teeth on said gears, a pawl engaging said ratchet-teeth on the gear of higher denomination, a lever carrying said pawl, means for moving said lever in one direction to cause the pawl to slide over the ratchet-teeth a distance of one tooth as the other gear is turning its denominational-wheel from nine to zero, and means for moving the lever in the opposite direction to cause the pawl to turn said gear a distance of one increment.

120. The combination with a typewriter and printing-keys therefor, of an adding-attachment controlled by said printing keys and including two adjacent denominational-wheels and gears for turning the same, ratchet-teeth on said gears, a pawl engaging said ratchet-teeth on the gear of higher denomination, a pivoted lever carrying said pawl, an abutment on said lever, spaced cams on the gear of lower denomination, an arm engaging the aforementioned abutment and carrying a pin extending into the path of the aforementioned cams whereby said pawl-carrying lever is moved to carry the pawl back over one tooth as the lower denominational-wheel is moving from nine to zero, and means for rocking said lever to move the pawl forward and turn the gear of higher denomination a distance representing one unit.

121. The combination with a typewriter and printing-keys therefor, of an adding-attachment controlled by said printing keys and including adjacent denominational-wheels and gears for turning the same, a revoluble cam positioned to move between said adjacent gears, a stud carried by said cam, ratchet-teeth on the aforementioned gears, a pawl engaging said teeth on the gear of higher denomination, a pivoted lever one end of which carries said pawl and the other of which is adapted to be projected into the path of the said stud when the lever is rocked, an abutment carried by said lever, a series of spaced cams on the gear of lower denomination, a pivoted lever having a projection lying in the path of said cams, a shoulder on said lever for engagement with the previously-referred to abutment whereby said first-mentioned lever is rocked when one of the cams on the gear of lower denomination engages said projection, and means for turning said revoluble cam.

122. The combination with a typewriter and printing-keys therefor, of an adding attachment controlled by said printing keys and including adjacent denominational-wheels and gears for turning the same, a revoluble cam positioned to move between said adjacent gears, a stud carried by said cam, ratchet-teeth on the aforementioned gears, a pawl engaging said teeth on the gear of higher denomination, a pivoted lever one end of which carries said pawl and the other of which is adapted to be projected into the path of the said stud when the lever is rocked, a yieldable abutment carried by said lever, a series of spaced cams on the gear of lower denomination, a pivoted lever having a projection lying in the path of said cams, a shoulder on said lever in engagement with the previously-referred to abutment whereby said first-mentioned lever is rocked when one of the cams of the gear of lower denomination engages said projection, and means for turning said revoluble cam.

123. The combination with a typewriter and printing-keys therefor, of an adding-attachment controlled by said printing keys and including a denominational-wheel and a gear for turning the same, means independent of the typewriter keys for turning said gear, and means for preventing reverse movement thereof.

124. The combination with a typewriter and printing-keys therefor, of an adding-attachment controlled by said printing keys and including a denominational-wheel and a gear for turning the same, means independent of the typewriter keys for turning said gear, and means for preventing excessive forward movement thereof.

125. The combination with a typewriter and printing-keys therefor, of an adding-attachment controlled by said printing keys and including a denominational-wheel, and a gear for turning the same, means independent of the typewriter keys for turning said gear, and means for preventing reverse movement and excessive forward movement thereof.

126. The combination with a typewriter and printing-keys therefor, of an adding-attachment controlled by said printing keys and including a denominational-wheel and a gear for turning the same, a locking-gear meshing with the main gear, a plurality of ratchet-teeth carried by said locking gear, and a pawl always in engagement with said teeth to prevent rearward movement of the main gear.

127. The combination with a typewriter and printing-keys therefor, of an adding-attachment controlled by said printing keys and including a denominational-wheel and a main-gear for turning the same, a locking-gear meshing with the main-gear, a plurality of ratchet-teeth carried by said locking-gear, and a pawl adapted to be brought into engagement therewith at the proper moment to prevent excessive movement of the main-gear.

128. The combination with a typewriter and printing-keys therefor, of an adding-attachment controlled by said printing keys and including a denominational-wheel and a main-gear for turning the same, a locking-gear meshing with the main-gear, a plurality of ratchet-teeth carried by said locking-gear, a pawl always in engagement therewith to prevent rearward movement of the main-gear, and a second pawl adapted to be brought into engagement with said teeth at the proper moment to prevent excessive movement of the main-gear.

129. The combination with a typewriter and printing-keys therefor, of an adding-attachment controlled by said printing keys and including a denominational-wheel and a main-gear for turning the same, a locking-gear meshing with the main-gear, instrumentalities for turning said main-gear, means for positioning said gear-turning instrumentalities including a selective-plate, a pivoted arm connected thereto, a slidable lever connected to said arm and controlled by the typewriter, a pivoted plate carrying a stop and a spring for normally forcing said stop against the arm, and a pawl on said plate engaging the teeth on the locking-gear.

130. The combination with a typewriter and printing-keys therefor, of an adding-attachment controlled by said printing keys and including a denominational-wheel and a main-gear for turning the same, a locking-gear meshing with the main-gear, instrumentalities for turning said main-gear, means for positioning said gear-turning instrumentalities including a selective-plate, a pivoted arm connected thereto, a slidable lever connected to said arm and controlled by the typewriter, a pivoted plate carrying a stop and a spring for normally forcing said stop against the arm, a pawl on said plate engaging the teeth on the locking-gear, and means for engaging said plate and moving the locking-pawl out of engagement previous to the operation of the device for carrying from one denominational-wheel to the next higher.

131. The combination with a typewriter and printing-keys therefor, of an adding-attachment controlled by said printing keys and including denominational-wheel and a main-gear for turning the same, a locking-gear meshing with the main-gear, instrumentalities for turning said main-gear, means for positioning said gear-turning instrumentalities including a selective-plate, a pivoted arm connected thereto, a slidable lever connected to said arm and controlled by the typewriter, a pivoted plate carrying a stop and a spring for normally forcing said stop against the arm, a pawl on said plate engaging the teeth on the locking gear, a lever engaging said plate, and means for moving said lever to rock the plate and carry the pawl out of locking-engagement previous to the operation of the devices for carrying from one denominational-wheel to the next higher.

132. The combination with a typewriter and printing-keys therefor, of an adding-attachment controlled by said printing keys and including a denominational-wheel and a main-gear for turning the same, a locking-gear meshing with the main-gear, instrumentalities for turning said main-gear, means for positioning said gear-turning instrumentalities including a selective-plate, a pivoted arm connected thereto, a slidable lever connected to said arm and controlled by the typewriter, a pivoted plate carrying a stop and a spring for normally forcing said stop against the arm, a pawl on said plate engaging the teeth on the locking-gear, a lever engaging said plate, a cam for operating said main-gear-turning instrumentalities, a stud carried by said cam, and means connected to said last-mentioned lever and adapted to be projected into path of the stud.

133. The combination with a typewriter and printing-keys therefor, of an adding-attachment controlled by said printing keys and including adjacent denominational-wheels and main-gears for turning the same, a revoluble cam positioned to move between said adjacent gears and carrying a stud, a locking-gear in engagement with the main-gear of higher denomination, ratchet-teeth carried by said locking-gear, a pivoted plate provided with a pawl for engagement with said teeth, ratchet-teeth on the gear of higher denomination, a pawl engaging said teeth and carried by a pivoted lever, one end of said lever being adapted to be projected into the path of the cam-carried stud, an abutment on said last-mentioned lever, spaced-cams on the main-gear of lower denomination, a pivoted arm having a projection in the path of said spacing-cams and provided with a shoulder engaging said abutment, an angle-lever pivoted to said last-mentioned lever and having one arm adapted to be projected into the path of the cam-carried stud, a shoulder on said locking-pawl - carrying - plate, and a lever-arm connected to the other arm of said anglelever and arranged to engage said shoulder and move the plate whereby the pawl is removed from locking-engagement previous to the carrying-operation.

134. The combination with a typewriter and printing-keys therefor, of an addingattachment controlled by said printing keys and including a series of denominationalwheels, a series of gears for turning the denominational-wheels, and means independent of the typewriter keys for moving all of said gears simultaneously to produce a computation.

135. The combination with a typewriter and printing-keys therefor, of an addingattachment controlled by said printing keys and including a series of denominationalwheels, a series of gears for turning the same, flanges on the gears, notches in said flanges, pawls adapted to engage in the notches and means for moving the pawls to turn the gears simultaneously.

136. The combination with a typewriter and printing-keys therefor, of an addingattachment controlled by said printing keys and including a denominational - wheel, a gear for turning the same, a flange on the gear, said flange being provided with a suitable notch, a shaft supporting the gear loosely thereon, a plate fixed on said shaft and carrying a pawl arranged to engage the notch, and means for turning said shaft.

137. The combination with a typewriter and printing-keys therefor, of an addingattachment controlled by said printing keys and zero-producing instrumentalities including a denominational-wheel, a gear for turning the same, a flange on the gear, said flange having a suitable notch therein, a shaft supporting the gear loosely therein, ratchet-teeth on the gear, a pawl in engagement with the teeth and carried by a suitable lever, means for operating said lever to turn the gear after the gear of lower denomination has moved its denominational - wheel from nine to zero, a plate fixed to said shaft and provided with a pawl arranged to engage the notch, and means for preventing operation of said lever during the movement of the zero-positioning devices.

138. The combination with a typewriter and printing-keys therefor, of an addingattachment controlled by said printing keys and zero-producing instrumentalities including a denominational-wheel, a gear for turning the same, a flange on the gear, said flange having a suitable notch therein, a shaft supporting the gear loosely therein, ratchet-teeth on the gear, a pawl in engagement with the teeth and carried by a suitable lever, means for operating said lever to turn the gear after the gear of lower denomination has moved its denominationalwheel from nine to zero, a plate fixed to said shaft and provided with a pawl arranged to engage the notch, and means carried by the said fixed plate for preventing operation of said lever during the movement of the zero-positioning devices.

139. The combination with a typewriter and printing-keys therefor, of an addingattachment controlled by said printing keys and zero-producing instrumentalities including a denominational-wheel, a gear for turning the same, a flange on the gear, said flange having a suitable notch therein, a shaft supporting the gear loosely thereon, ratchet-teeth on the gear, a pawl in engagement with the teeth and carried by a suitable lever, means for operating said lever to turn the gear after the gear of lower denomination has moved its denominationalwheel from nine to zero, a plate fixed to the shaft and provided with a pawl arranged to engage the said notch, a slot in said plate adapted to engage the aforementioned lever and prevent movement thereof during operation of the zero-positioning devices.

140. The combination with a typewriter and printing-keys therefor, of an addingattachment controlled by said printing keys and zero - producing instrumentalities, including a denominational-wheel, a gear for turning the same, a flange on the gear, said flange having a suitable notch therein, a shaft supporting the gear loosely thereon, ratchet-teeth on the gear, a pawl in engagement with the teeth and carried by a suitable lever, means for operating said lever to turn the gear after the gear of lower denomination has moved its denominationalwheel from nine to zero, a plate fixed to the shaft and provided with a pawl arranged to engage said notch, a radial slot in said plate adapted to engage the aforementioned lever and prevent movement thereof during operation of the zero-positioning devices.

141. The combination with a typewriter and printing-keys therefor, of an adding-attachment controlled by said printing keys and including a denominational - wheel, a gear for turning the same, means independent of the typewriter for operating said gear, means for locking said gear, zeropositioning-devices arranged to act upon said gear, and devices for releasing said locking-means previous to the operation of the zero-positioning devices.

142. The combination with a typewriter and printing-keys therefor, of an addingattachment controlled by said printing keys and including a denominational - wheel, a gear for turning the same, means independent of the typewriter for operating said gears, a locking-gear meshing with the main gear, means for holding said locking-gear, zero-positioning devices arranged to act upon said main-gear, and devices for releasing said holding-means during the operation of the zero-positioning devices.

143. The combination with a typewriter and printing-keys therefor, of an adding-attachment controlled by said printing keys and including a denominational-wheel, a main-gear for turning the same, a locking-gear meshing with the main-gear, ratchet-teeth on the locking-gear, a pawl engaging said teeth, a plate carrying said pawl and having an extension at its lower end, a bar overlying said extension, zero-producing-devices arranged to act upon said main-gear, and means for lowering the bar and thereby rocking said plate to release the pawl previous to the operation of the zero-positioning-devices.

144. The combination with a typewriter and printing-keys therefor, of an adding-attachment controlled by said printing keys and including a denominational-wheel, a main-gear for turning the same, a locking-gear meshing with the main-gear, ratchet-gear on the locking-gear, a pawl engaging said teeth, a plate carrying the pawl and having an extension at its lower end, a bar overlying said extension and supported on a plate provided with a nose, a shaft supporting said main-gear, a disk fixed to the shaft and connected to a pivoted plate by a suitable lever, a pawl on the last-mentioned plate and positioned to engage teeth on the side of a notched disk, said notches being arranged to engage the aforementioned nose, zero-positioning devices arranged to act on the main-gear, and means for turning the shaft on which the main-gear is supported.

145. The combination with a typewriter and printing-keys therefor, of an adding-attachment controlled by said printing keys and including a denominational-wheel, a main-gear for turning the same, ratchet-teeth on said gear, a pawl-carrier positioned adjacent the ratchet-teeth and having a segmental-rack thereon, a selector-plate meshing with said segmental-rack, means for moving the selector-plate, zero-positioning-devices arranged to act on the main-gear, and instrumentalities for locking the selector-plate against movement during the operation of the zero-positioning devices.

146. The combination with a typewriter and printing-keys therefor, of an adding-attachment controlled by said printing keys and including a denominational-wheel, a main-gear for turning the same, ratchet-teeth on said gear, a pawl-carrier positioned adjacent the ratchet-teeth and having a segmental-rack thereon, a selector-plate meshing with said segmental-rack, means for moving the selector-plate, a notch in the selector-plate, zero-positioning devices arranged to act on the main-gear, and a dog positioned to engage the aforementioned notch during the operation of the zero-positioning devices.

147. The combination with a typewriter and printing-keys therefor, of an adding-attachment controlled by said printing keys and including a denominational-wheel, a main-gear for turning the same, ratchet-teeth on said gear, a pawl-carrier positioned adjacent the ratchet-teeth and provided with a segmental-rack, a selector-plate meshing with the segmental-rack, means for moving the selector-plate, a notch in the selector-plate, a dog normally out of engagement with said notch, a zero-positioning-device operating on the main-gear, and a cam controlled by the zero-positioning-devices for engaging said dog and moving it into engagement with the selector-plate.

148. The combination with a typewriter and printing-keys therefor, of an adding-attachment controlled by said printing keys and including denominational-wheels, an accumulator-device including denominational-wheels and coöperatively associated with the adding-attachment, means for resetting the denominational-wheels of the adding-attachment to zero-position, and instrumentalities for rendering the accumulating-device inoperative during such resetting.

149. The combination with a typewriter and printing-keys therefor, of an adding-attachment controlled by said printing keys and including denominational-wheels, an accumulator including separate denominational-wheels coöperatively associated with the adding attachment, the denominational-wheels of the accumulator being carried by a vertically-movable shaft.

150. The combination with a typewriter and printing-keys therefor, of an adding-attachment controlled by said printing keys and including denominational-wheels, gear members carried by said wheels, a set of stationary intermediate-gear-wheels in engagement with said first-mentioned gears, an accumulating-device including denominational-wheels, and gears carried thereby arranged to engage said intermediate-gear-wheels, and means for moving said accumulating-device away from engagement with the intermediate-gear-wheels.

151. The combination with a typewriter and printing-keys therefor, of an adding-attachment, controlled by said printing keys and including denominational-wheels, an accumulating-device coöperatively associated with the adding-attachment and including denominational-wheels carried on a movable shaft, arms supporting said shaft, a lever connected to said arms, means for resetting the denominational-wheels of the adding-attachment to zero-position, a hand-lever for operating said resetting-means, a cam-slot in said hand-lever, and a pin on the first-mentioned lever engaging said cam-slot.

152. The combination with a typewriter and printing-keys therefor, of an adding-attachment controlled by said printing keys and including denominational-wheels, an accumulator including separate denominational-wheels coöperatively associated with the adding-attachment, a vertically-movable shaft mounted in said accumulator, the denominational-wheels of the accumulator being carried by said vertically-movable shaft, and resetting devices for said accumulator.

153. The combination with a typewriter and printing-keys therefor, of an adding-attachment controlled by said printing keys and including denominational-wheels, selecting devices operated by the typewriter, means independent of the typewriter for operating the denominational-wheels, and devices for indicating the extent of movement of the selecting devices.

154. The combination with a typewriter and printing-keys therefor, of an adding attachment, controlled by said printing keys and including selecting devices and operating devices, and denominational-wheels and means other than said denominational-wheels for indicating the extent of movement of the selecting devices.

155. The combination with a typewriter and printing-keys therefor, of an adding attachment controlled by said printing keys and including a casing, a selector-plate, a bell-crank connected to the selector-plate, an indicator carried by the bell-crank and visible through an opening in the casing, and means for operating said selector-plate.

In testimony whereof, I affix my signature, in the presence of two subscribing witnesses.

EDWARD C. WALTER.

Witnesses:
EDMUND H. PARRY,
W. L. BILLMYER.